United States Patent

Shimada

(10) Patent No.: US 6,556,775 B1
(45) Date of Patent: Apr. 29, 2003

(54) IMAGE AND SOUND REPRODUCTION SYSTEM

(75) Inventor: Yasuomi Shimada, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/240,613

(22) Filed: Feb. 1, 1999

(30) Foreign Application Priority Data

Feb. 3, 1998 (JP) .......................................... 10-021855

(51) Int. Cl.[7] .......................... H04N 5/225; H04N 5/76; H04N 5/91; H04N 5/781; H04N 5/85; H04N 5/90
(52) U.S. Cl. ........................ 386/121; 386/125; 386/126
(58) Field of Search .......................... 386/4, 45, 52–53, 386/64, 125–126, 121; 348/584, 586, 598; 345/636, 473; 382/284

(56) References Cited

U.S. PATENT DOCUMENTS

| | | | | |
|---|---|---|---|---|
| 4,260,229 A | * | 4/1981 | Bloomstein | 352/50 |
| 4,827,532 A | * | 5/1989 | Bloomstein | 345/473 |
| 4,841,575 A | * | 6/1989 | Welsh et al. | 382/100 |
| 4,905,168 A | * | 2/1990 | McCarthy et al. | 345/473 |
| 4,913,539 A | * | 4/1990 | Lewis | 352/5 |
| 4,968,132 A | * | 11/1990 | Ferren | 352/46 |
| 5,034,806 A | * | 7/1991 | Ikeda et al. | 358/540 |
| 5,146,323 A | * | 9/1992 | Kobori et al. | 358/527 |
| 5,241,371 A | * | 8/1993 | Fukushima et al. | 348/578 |
| 5,274,453 A | * | 12/1993 | Maeda | 348/409.1 |
| 5,278,663 A | * | 1/1994 | Hong | 348/208 |
| 5,345,313 A | * | 9/1994 | Blank | 348/584 |
| 5,430,835 A | * | 7/1995 | Williams et al. | 707/500.1 |
| 5,473,441 A | * | 12/1995 | Inuiya et al. | 348/607 |
| 5,502,486 A | * | 3/1996 | Ueda et al. | 348/239 |
| 5,561,498 A | * | 10/1996 | Sekine et al. | 348/208 |
| 5,572,261 A | * | 11/1996 | Cooper | 348/512 |
| 5,608,839 A | * | 3/1997 | Chen | 704/231 |
| 5,703,997 A | * | 12/1997 | Kitamura et al. | 386/96 |
| 5,712,680 A | * | 1/1998 | Hieda | 348/220 |
| 5,841,941 A | * | 11/1998 | Morimoto et al. | 386/104 |
| 5,880,788 A | * | 3/1999 | Bregler | 345/473 |
| 5,914,748 A | * | 6/1999 | Parulski et al. | 348/239 |
| 5,940,139 A | * | 8/1999 | Smoot | 348/584 |
| 5,982,350 A | * | 11/1999 | Hekmatpour et al. | 345/473 |
| 5,986,718 A | * | 11/1999 | Barwacz et al. | 345/634 |
| 6,088,040 A | * | 7/2000 | Oda et al. | 345/441 |
| 6,137,919 A | * | 10/2000 | Gonsalves et al. | 348/586 |
| 6,147,716 A | * | 11/2000 | Ohki et al. | 348/584 |
| 6,201,925 B1 | * | 3/2001 | Brewer et al. | 386/111 |
| 6,215,505 B1 | * | 4/2001 | Minami et al. | 345/473 |
| 6,236,412 B1 | * | 5/2001 | Ojima | 345/474 |
| 6,366,316 B1 | * | 4/2002 | Parulski et al. | 345/634 |
| 6,392,710 B1 | * | 5/2002 | Gonsalves et al. | 348/441 |

* cited by examiner

Primary Examiner—Andrew Christensen
Assistant Examiner—Polin Chieu
(74) Attorney, Agent, or Firm—Stevens, Davis, Miller & Mosher, LLP

(57) ABSTRACT

An image and sound reproduction system which can perform reproduction while replacing a predetermined portion of a background image with another still picture is provided. Still picture synthesizing means combines an arbitrary first still picture with plural second still pictures serving as a background, and synthesis and reproduction controlling means controls the still picture synthesizing means, whereby the first still picture is combined with the plural second still pictures in accordance with position information for combining the first still picture with the second still pictures. The synthetic images are sequentially reproduced. In this case, the position of a partial region (dummy object) of a dummy still picture serving as a reference is determined, and a synthesizing position of a part (user object) of the first still picture is determined in accordance with the position coordinates of the dummy still picture.

35 Claims, 19 Drawing Sheets

FIG. 10
(1) file of moving picture
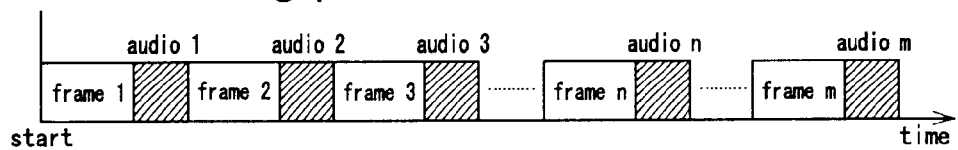
(2) group of audio data
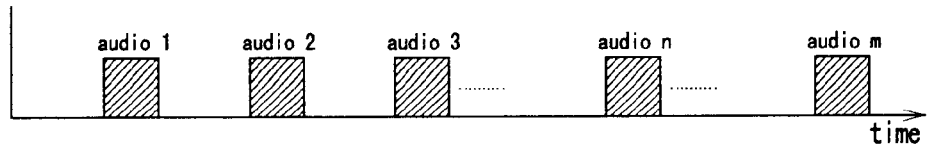
(3) group of still picuture file data
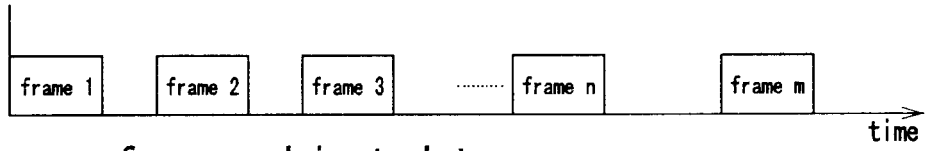
(4) group of user object data
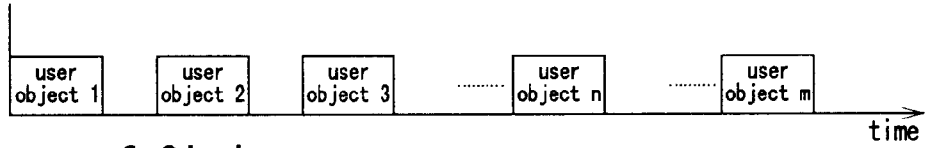
(5) group of GI data
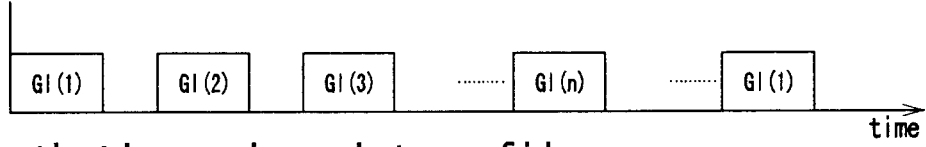
(6) systhetic moving picture file
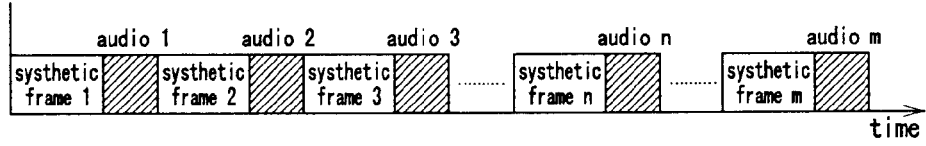

FIG. 14
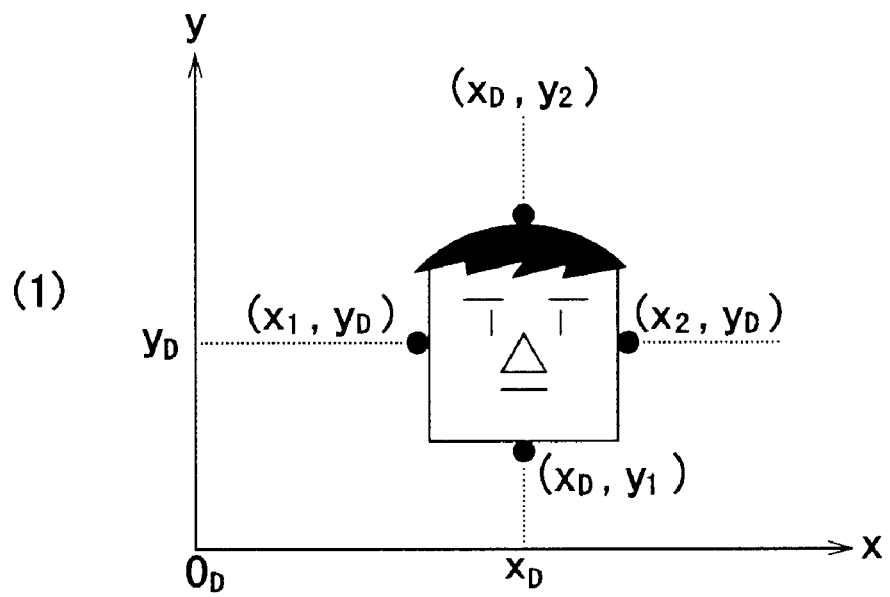
(1)
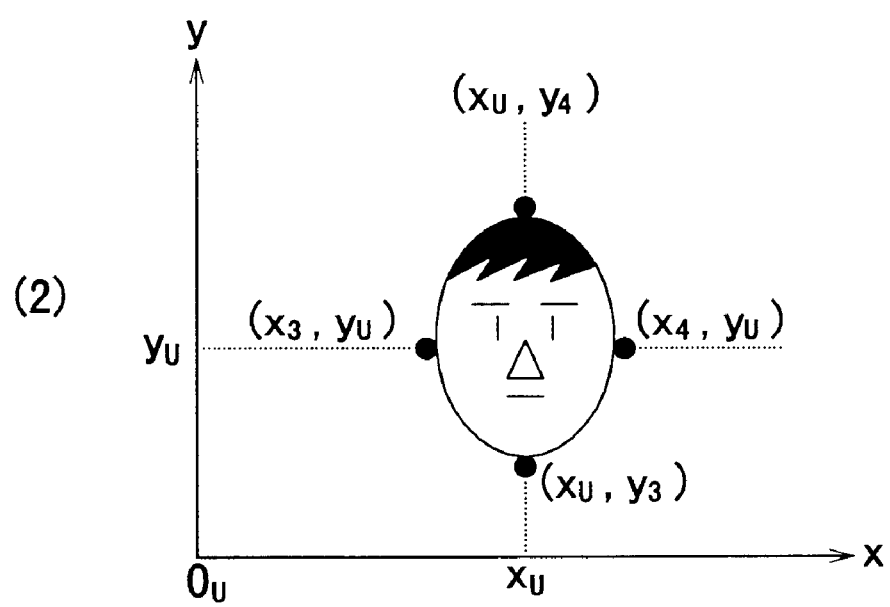
(2)

FIG. 16 story control table

| dummy | | group of stories | | |
|---|---|---|---|---|
| | | 1 | 2 | 3 |
| ① | | 1 | 1 | 1 |
| ② | | 1 | 1 | 1 |
| a | | 0 | 1 | 1 |
| u | | 0 | 1 | 1 |
| e | | 0 | 1 | 1 |
| o | | 0 | 1 | 1 |
| ④ | | 0 | 0 | 0 |
| ⑤ | | 0 | 0 | 1 |

FIG. 19
(1)
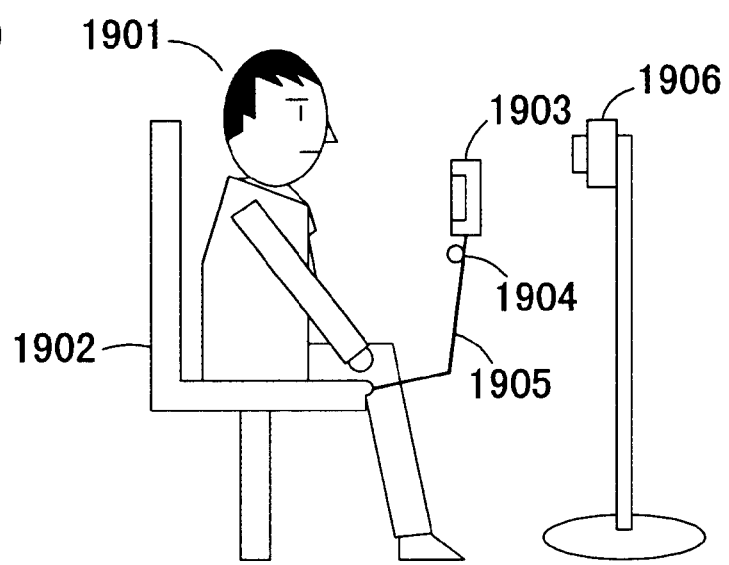
(2)
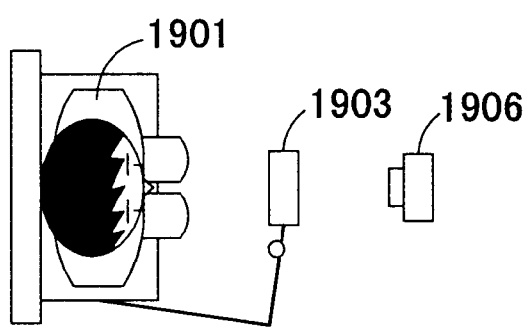
(3)
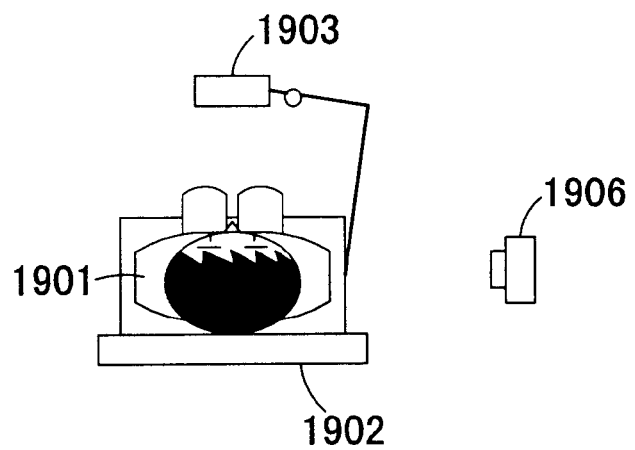

IMAGE AND SOUND REPRODUCTION SYSTEM

BACKGROUND OF THE INVENTION

1. Field of the Invention

The invention relates to an image and sound reproduction system which, when a predetermined portion of a background image is to be combined with a part of or the whole of another arbitrary still picture, can easily perform various kinds of reproductions in accordance with graphic interactive data (hereinafter, referred to as GI data), such as that a part of or the whole of the arbitrary still picture is sequentially reproduced while changing the contents by synthesis or replacement, and that a combination of a part of or the whole of the arbitrary still picture is repeatedly reproduced while changing the combination.

GI data are control data indicating information such as the kind and the synthesizing position of a still picture or an object in a still picture, a size, horizontal inversion, vertical inversion, longitudinal inversion, an angle, rotation, and distortion on two-dimensional coordinates or three-dimensional coordinates, and a motion in which these motions are combined with each other.

2. Description of Prior Art

Conventionally, a part of a background image is replaced with another image by the so-called chromakey technique in which an image of an object that is taken with setting the background blue is combined with the background image. In this technique, no control data relating to a motion change of the object is used. Therefore, the technique has a drawback in that it is difficult to, after an image of an object is taken or after an object is combined with a background picture, produce a synthetic image in which the shape, the state, the illumination, the sound, or the like of the imaged object is changed.

In a computer graphics (hereinafter, referred to as CG) technique, a control such as that using so-called motion capture is performed in which motions of predetermined portions of an objective are measured directly or indirectly by sensors and the objective in the CG is controlled by the motion information of the predetermined portions of the objective.

However, such a CG is not provided with means for producing a control signal relating to a motion of an object which changes in linking relationships with frames of a background image that has been already taken, means for selecting and changing a still picture to be combined, controlling means for correlating identification numbers of continuous still pictures serving as a background when the still pictures are to be combined with another still picture or an object which is externally captured, with position information or corrected position information which describes the place where an arbitrary user image other than the background is to be combined, or means for storing control data relating to such information. Therefore, the CG has a drawback in that, after an image of an object is taken or after a synthetic image of an object and a background image is obtained by synthesis or the like, it is difficult to produce a synthetic image by replacing the object of the background image with another object image in which the kind, the size, the brightness, or the voice or sound of the object is selectively changed in accordance with the motion of the object, or superimposing the images.

When a three-dimensional CG due to polygon data is used as a background image, the number of coordinates of polygons is so large that the data processing is complicated and requires a prolonged time period. In order to control such a three-dimensional CG so as to be rendered as a two-dimensional image, therefore, a dedicated hardware which functions as high-speed and dedicated image calculating and generating means is necessary, thereby producing problems such as that the cost is increased, that the image reproduction rate, the number of polygons, the image quality, and the like are restricted, and that the development period is prolonged. When control data relating to the motion of an object in a moving picture image which has been once reproduced is stored and output, there arise drawback such as that the image reproduction rate, the number of polygons, the image quality, and the like are further restricted. In this case, neither means for selectively inputting a user object which is to be combined, nor information for selection exists, and hence a synthetic moving picture cannot be replaced with another one, only by replacement of a photo by the user.

As described above, in the prior art, means for realizing partial replacement of a background image file requires a very sophisticated technique and dedicated hardware, and is expensive. That is, a moving picture file of the prior art fails to, for each frame, have GI data which is motion selection information correlating information for controlling a still picture that is an objective of synthesis or replacement of a background image, with an identification number of a still picture to be combined. Therefore, it is not easy to combine or replace a still picture that is an objective of synthesis or replacement, with another arbitrary still picture. In a model in which a still picture serving as a material of synthesis or replacement, or an object segmented from a part of a still picture is represented by three-dimensional coordinates, there is a problem in that the amount of data is so large that the system is very complicated.

In other words, in a background image in the prior art, each frame of the image consists of data which have been processed as frame data. Consequently, there is no means for changing data in each frame, and post processing of such an image is hardly performed.

This will be described more plainly. In a movie software, only actors or actresses play. As far as a movie is taken on the basis of actual images, a usual person cannot appear in the movie unless the person is in the site of taking the movie. Furthermore, it is impossible to change the cast after a movie is taken. A person can enjoy oneself with freely deforming an image of the face synthesized by a CG or the like. However, there is no means for automatically adding such a deformed image into images which are previously completed, such as a movie. Therefore, a still picture must be separately produced for each frame, and the still pictures must be manually combined with a background moving picture, such as a movie. In this way, the user cannot easily enjoy such synthesis.

SUMMARY OF THE INVENTION

It is an object of the invention to provide an image and sound reproduction system in which a predetermined portion of a background image can be replaced with another still picture, and a still picture can be controlled in accordance with GI data indicating the position, motion of the predetermined portion of the background image, and the like, and in which the replacement and control of the still picture can be realized easily and economically.

Specifically, the object of the invention is to provide easily and economically an image and sound reproduction system in which a new moving picture using the same background can be easily obtained by replacing only the face or the body of the user with that of a person appearing in a background image, a new moving picture can be easily produced by replacing only a background image with another one even when the same user image is used, and image reproduction is enabled while easily selecting the story in accordance with the kind and the number of user images.

In order to solve the problems, the image and sound reproduction system of the invention comprises the following means:

(1) still picture synthesizing means for combining an arbitrary first still picture with plural second still pictures serving as a background; and synthesis and reproduction controlling means for, in accordance with position information for combining the first still picture with the second still pictures or selection information for selecting one from the one or more arbitrary first still pictures, controlling the still picture synthesizing means so as to combine the first still picture with the second still pictures, and sequentially reproduce synthetic images;

(2) means for performing reproduction with, by using the position information or the selection information, combinedly using means for capturing the first still picture and an arbitrary n-th (n is an arbitrary integer) still picture other than the first still picture;

(3) means for performing reproduction with, by using the position information or the selection information, combinedly using means for capturing plural arbitrary m-th (m is an arbitrary integer) still picture other than the second still pictures;

(4) synthesis and reproduction controlling means for setting plural dummy objects in the second or m-th still pictures serving as a background, and controlling the still picture synthesizing means in accordance with position information assigned to the dummy objects, so as to combine the first still picture or the n-th still picture with plural still pictures or the plural m-th still pictures, and sequentially reproduce synthetic images;

(5) user object extracting means for setting a partial region (hereinafter, referred to as dummy object) of a dummy still picture serving as a reference, and for extracting a part (hereinafter, referred to as user object) of the first still picture corresponding to arbitrary position coordinates of the dummy object; edge detecting means for detecting an edge of the user object extracted by the user object extracting means; and correcting means for calculating position correction information which correlates arbitrary pixel coordinates of the edge detected by the edge detecting means with pixel coordinates of the first dummy object corresponding to the arbitrary pixel coordinates, and for, on the basis of the position correction information, correcting the position information for combining the first still picture with the second still pictures or the n-th still pictures;

(6) synthesizing means for setting a partial region (hereinafter, referred to as unit object) of the first dummy object or an arbitrary L-th dummy object other than the user object, and for combining the unit object with an image of the user object;

(7) correlating means for assigning an identification number to the first still picture or an object in the first still picture, and for correlating deformation information of the first still picture or the object in the first still picture with the position information describing a place where synthesis is to be performed, the deformation information including a size, horizontal inversion, vertical inversion, longitudinal inversion, an angle, rotation, and distortion on two-dimensional coordinates or three-dimensional coordinates, and combinations of the above;

(8) means for decomposing a moving picture file into a continuous still picture file, and for respectively assigning identification numbers to still pictures as plural m-th still pictures other than the first still picture;

(9) moving picture/sound separating means for separating sound information from a moving picture in a moving picture file containing sound; and moving picture/sound synthesizing means for combining images which are synthesized and reproduced by image processing with the sound information separated from the moving picture file into one moving picture and sound file;

(10) means for capturing an external sound; and moving picture/sound synthesizing means for combining the captured external sound information, images which are synthesized and reproduced by image processing, and sound information separated from the moving picture file into one moving picture and sound file;

(11) means for capturing the first still picture, and means for masking a part of the captured first still picture;

(12) means for setting plural shapes of a still picture mask;

(13) means for displaying plural masked still pictures which are masked by the means of (12); and means for selecting an arbitrary masked still picture from the plural masked still pictures;

(14) means for displaying a masked still picture; and means for, while a user observes the masked still picture, adequately adjusting and determining a capturing position, an expression, or the like of the user;

(15) model converting means for correlating the first still picture with a standard model configured by three-dimensional coordinates; two-dimensional image generating means for generating a two-dimensional image which is obtained by observing a model at an arbitrary, the model being obtained as a result of model conversion by the model converting means; and synthesizing means for combining the two-dimensional image as the plural first still pictures with plural background still pictures;

(16) displaying means for displaying the image taken by imaging means, the displaying means being separate from the imaging means; and means for moving the displaying means together with an object;

(17) means for selecting motion data, i.e., position information or selection information to be correlated, in accordance with the number and the kind of the first still pictures;

(18) arbitrary reproduction enabling means; and means for, in response to enabling information by the reproduction enabling means, starting sequential reproduction of arbitrary synthetic images;

(19) means for selecting arbitrary plural sets of position information correlated with an arbitrary n-th still picture, and for reproducing the n-th still picture and the plural m-th background still pictures, with combining a sequence of the reproduction, or means for repeating the reproduction;

(20) recording means for recording a background image into a first layer of a disk, and for classifying and recording the position information or the deformation information of the still picture or an object in the still picture, into a second layer, the deformation information including a size, horizontal inversion, vertical inversion, longitudinal inversion, an angle, rotation, and distortion on two-dimensional coordinates or three-dimensional coordinates, and combinations of the above, or reproducing means for sequentially reproducing the recorded first layer, on the basis of information recorded in the second layer;

(21) means for printing out an arbitrary still picture in the obtained synthetic images;

(22) means for handling a synthesized still picture as one of the second or m-th still pictures; and

(23) means for handling a synthesized moving picture as one moving picture file.

The synthesizing means may use any one of methods such as that in which a new object to be replaced is superimposed on an original object to be replaced in a moving picture, that in which no original object to be replaced in a moving picture that originally serves as a background exists and synthesis is performed by superimposing a new object to be replaced thereon, and that in which, even when an original object to be replaced in a moving picture that originally serves as a background exists, the object is replaced with a new object to be replaced.

Plural original objects to be replaced in a background image may be used, and plural new objects to be replaced may be used.

By using position information and deformation information of a new object to be replaced, an original object may be arbitrarily replaced with an n-th new object other than the new object to be replaced. The expression of "n-th" means an n-th (n is a positive integer) new object of a number of new objects. Similarly, the expression of "m-th" means an m-th (m is a positive integer) image group of image groups of different kinds in a series of background image groups.

Next, the functions of the configurations of (1) to (23) will be described.

According to the configuration of (1), the synthesizing position of an arbitrary still picture in a background still picture can be freely set in accordance with position information. When the synthetic images are sequentially reproduced, therefore, the arbitrary still picture is moved, and hence the pictures can be reproduced just as a synthetic moving picture in which the arbitrary still picture moves as the movement of plural still pictures of the background. With respect to position information of number P of the first still pictures which are sequentially reproduced, (P+1)-th position information is a correction corresponding to a movement of the object in the first still picture. Therefore, the configuration has an effect that position information can be easily set. For portrait photos of the same user, when a photo of the face directed to the front, and that of the obliquely directed face are selected, the photos can be instantly reproduced as a synthetic moving picture in which the face of the user looks like moving.

According to the configuration of (2), even for the same position information, a synthetic moving picture of the face of a different user can be instantly reproduced only by replacement with a portrait photo of a second user other than the face of a first user, and without changing position information.

According to the configuration of (3), synthetic moving pictures of a different background can be instantly reproduced only by replacing a background still picture with a different still picture, and without replacement of a series of face directions and expressions of the same user. Furthermore, an entirely different synthetic moving picture of a photo of the face of the same user or another kind, for example, an automobile can be instantly reproduced without changing position information.

According to the configuration of (4), for example, a photo of Mr. A which is a user object can be subjected to synthesis while selecting the position of an arbitrary dummy object in the background.

According to the configuration of (5), in the case where an image of the face of a user is to be taken, even when the position of the face of the user is caused to be deviated from the position of a predetermined dummy object by camera shake or the like, it is possible to correct the synthesizing position so as not to be deviated.

According to the configuration of (6), the mouth portion of a dummy object, or that of an arbitrary user object may be used as a dummy object. Even when there is only one photo of a certain user, the mouth portion of the dummy object can be used as the mouth portion of the user, thereby providing motion to only one image of the mouth portion of the user so that the user looks like speaking. Therefore, labor of taking plural photos can be eliminated.

According to the configuration of (7), even when there is only one photo of a user, still pictures which are previously prepared by deforming the image of the photo by the size, horizontal inversion, vertical inversion, longitudinal inversion, an angle, rotation, and distortion on two-dimensional coordinates or three-dimensional coordinates, and combinations of the above can be sequentially reproduced. Therefore, the motion and expression of the user can be provided with abundant changes.

According to the configuration of (8), since identification numbers are assigned to still pictures of a moving picture, position information of synthesis can be correlated with all of arbitrary still pictures, so that one scene of a moving picture of the same background can be repeatedly used or an arbitrary background can be used in different scenarios.

According to the configuration of (9), sound information contained in a moving picture file serving as a background can be used as it is after synthesis, or can be rewritten at one time for each file, together with other sound information. Since the processing can be performed in the unit of one file, instructions for sequentially continuously reproducing information can be given by one reproduction command, so that labor of repeatedly inputting a reproduction command can be eliminated.

According to the configuration of (10), Arbitrary sound which is captured by the user can be reproduced in place of sound contained in the original moving picture file, together with an image.

According to the configuration of (11), when an image of the face of the user is to be taken, an image of the face only can be taken while hiding the body, or an image can be combined or replaced by using a favorite portion only.

According to the configuration of (12), even in the case of shapes to be combined which are largely different from each other, such as images of the face of the user at various angles or an arbitrary automobile, the same effect as (11) above can be attained by preparing plural masks.

According to the configuration of (13), synthesis using the most favorite image of the face among the plural images taken by using plural masks in (12) above is enabled, or synthetic moving pictures in which different masking states or expressions of the user are used in the same background can be instantly seen with switching over the pictures. When an image of the face of the user is to be taken, the imaging can be performed while checking the displayed masking state. Therefore, the imaging can be performed at a favorite position or without deviating from a preset position of a dummy object, and labor of correcting the position after the imaging can be omitted.

According to the configuration of (14), a still picture of an instant or position at which a favorite expression of the user is obtained by pressing the shutter by the user at an arbitrary instant, or that of an automobile or the like of an instant at which the most favorite illumination or reflection state is attained can be used in synthesis.

According to the configuration of (15), labor of taking plural photos of the user can be omitted. Furthermore, complex deformation can be made by moving coordinates of a three-dimensional model, so that variations of a synthetic moving picture are increased. A method may be employed in which a three-dimensional model of a shape of a face or mouth portion of an object to be replaced is converted into a two-dimensional model, the information of the obtained two-dimensional image is output as an shape of the mouth portion of a new object to be replaced, and the information of the two-dimensional image is selectively displayed as a selected signal of the new object to be replaced. This method has an advantages that the object can be selectively displayed at plural angles, and that it is not required to perform the imaging at plural angles. The conversion from a three-dimensional model to a two-dimensional image is realized by a process which is called rendering and in which a three-dimensional model having coordinates in three axes such as the depth, the height, and the width is seen from a camera point at the coordinate origin and the image on the camera is converted as a model having coordinate data in two axes or two dimensions of the height and the width.

According to the configuration of (16), even when the user is directed to the front, the user can check a change of the expression and position in profile of the user. Therefore, imaging of a favorite profile or at appropriate synthesizing position is enabled, and therefore there arises no case where distasteful photos are taken and the imaging is repeatedly performed.

According to the configuration of (17), when an angry or crying face in expressions of the user is set as the kind of the first still picture, position information or selection information of a story corresponding to the selected face is selected, so that, in the case of an angry still picture, a synthetic moving picture of an angry story is produced, and, in the case of a crying still picture, a still picture of a crying story is reproduced. Furthermore, it is possible to determine whether deformation processing is necessary or not. When the first still pictures are small in number and the number of variations of the expressions of the face is small, for example, there may arise necessity for producing various expressions of the face by using modification information. By contrast, when the first still pictures are large in number, modification information may be unnecessary. When deformation processing is not required, the process rate can be increased.

According to the configuration of (18), the system may be provided with a function such as that, when a certain point is attained in a game or the like, reproduction is started.

According to the configuration of (19), plural different movies can be synthesized by using portraits of the same user, or a laughing story using a crying face and a crying story using a laughing face may be synthesized so that fun due to the unbalance can be created.

According to the configuration of (20), a player which reproduces only the first layer can be differentiated from a player which can reproduce also the second layer. Even when the first and second layers are recorded on the same disk, therefore, a user who uses the second layer can be charged in a manner different from a user who uses only the first layer. Furthermore, it is not required to prepare plural recording disks, and hence labor in operations by the user can be eliminated, and the kinds of disks are not increased, thereby reducing the cost.

According to the configuration of (21), in the case where an obtained synthetic moving picture is to be provided as a souvenir, when the user does not have a reproducing machine, one or plural favorite scenes or plural continuous scenes can be provided as a souvenir.

According to the configuration of (22) or (23), plural first still pictures can be used in one moving picture file.

As described above, according to the image and sound reproduction system of the invention, position information, deformation information, and information of motion and the like of a predetermined portion of a moving picture which is to be combined or replaced with another still picture are reproduced or captured from the outside. Therefore, even a usual user who has no special knowledge can reproduce an arbitrary synthetic image in which an arbitrary still picture is controlled, only by selecting a photo. In an imaging process for capturing a still picture required for the reproduction, position correction information, mask selecting means, or a dedicated jig can be used, thereby enabling the user to capture a still picture easily, accurately, and economically. Furthermore, a substantial reproduction system for an arbitrary synthetic image can be configured which can be enjoyed with using an external sound, or unlimitedly combining plural synthetic images with one another in linking relationships with a quiz, a game, or the like.

BRIEF DESCRIPTION OF THE DRAWINGS

FIG. 10 is a diagram illustrating the operations of moving picture/sound separating means 104, still picture file converting means 105, and moving picture/sound synthesizing means 130 in the embodiment of the image and sound reproduction system of the invention, and showing a manner of processing files in separation of an image and sound file, formation of a synthetic image as a moving picture, and combination with a sound file;

FIG. 14 is a diagram illustrating the operations of object coordinate comparing means 119, and object coordinate correcting means 120;

FIG. 16 is a diagram illustrating the operation of story controlling means 137;

FIG. 19 is a schematic view showing the configuration of a jig which enables the user to perform an imaging process while seeing a portrait of the user under a state where the user is directed to the front.

DESCRIPTION OF THE PREFERRED EMBODIMENTS

Figure 1:
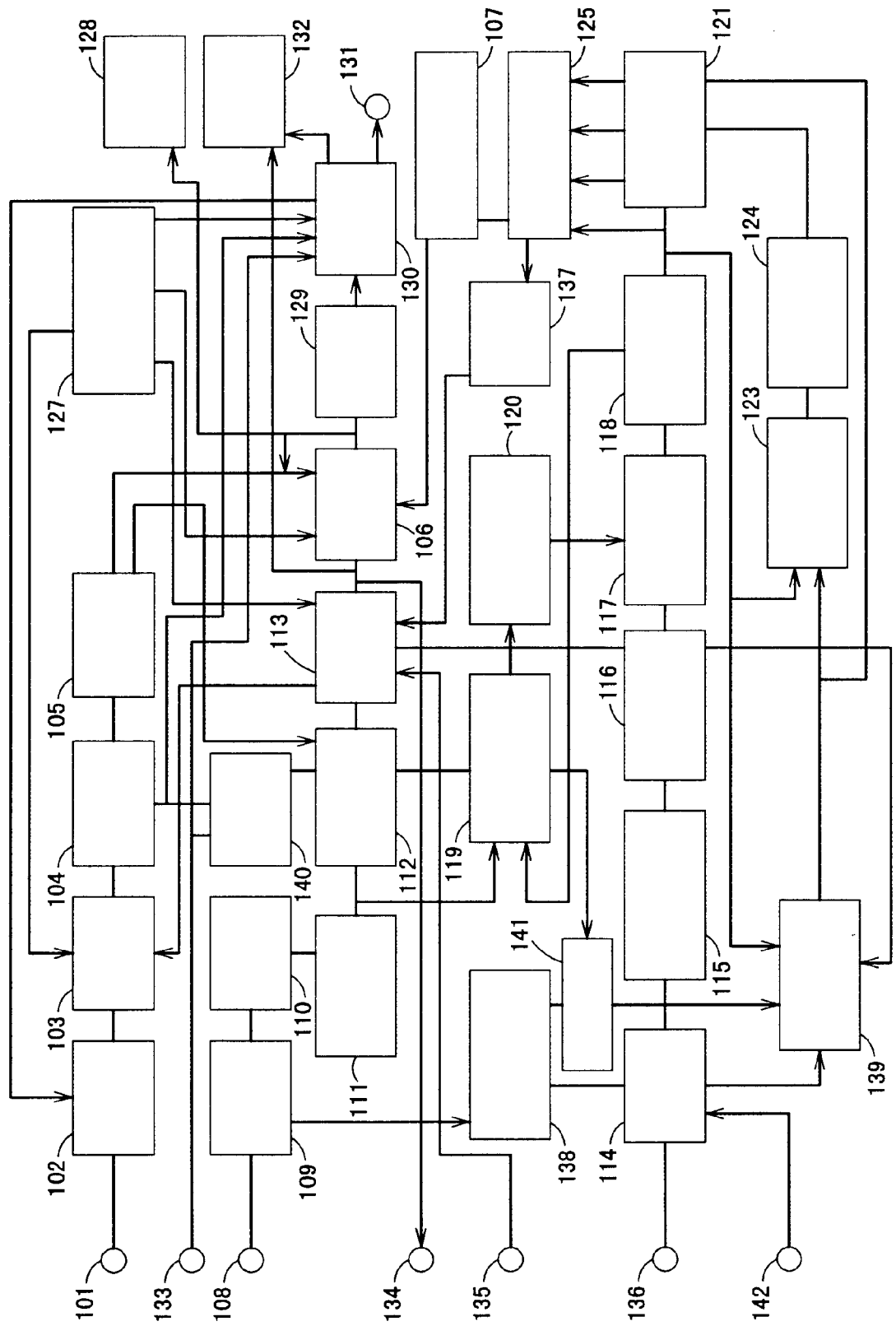
FIG. 1 is a block diagram showing the configuration of an image and sound reproduction system of an embodiment of the invention.

Prior to the following description of embodiments, the basic configuration of the image and sound reproduction system of the invention will be described. In the image and sound reproduction system of the invention, a storage medium such as an optical disk or a semiconductor memory is used as means for storing a first still picture which is to be changed in linking relationships with still picture frames of a background image, and control data (hereinafter, referred to as GI data) containing position information relating to the motion of an object in the still picture, and the control data recorded on the storage medium are read out.

When the face of a human or the like is used as the first still picture, means for reading generated GI data or outputting the data from a semiconductor memory, and for changing the motion of another face object is disposed, whereby GI data of a new object to be replaced are generated. Even in the case of a background image which has been already recorded, therefore, a usual user can easily select a user data to be replaced, by using the GI data.

Similarly, in the case where the face of a human or the like is used as the first still picture, means for, when edition of, for example, replacing the face with another face object is to be performed, selectively displaying the shape of the mouth portion of the face object which is to be replaced or motion-controlled, on the basis of a selection signal correlated with the contents of utterance of an object in a background image or the contents of utterance of the user is disposed, whereby GI data of a new object to be replaced are generated. Even in the case of a background image which has been already recorded, therefore, a usual user can easily select a user data to be replaced, by using the GI data.

In embodiments described below, processing is performed while using recording/reproducing means such as an optical disk or a semiconductor memory, as means for storing GI data and then reading out the data. Such recording/reproducing means is well known, and hence its description is omitted.

In the case where a polygon image, which is usually used in a three-dimensional CG, is used as a background and a user object is to be combined by texture mapping with a polygon to be replaced and combined, the selection information of the invention allows a moving picture to be synthesized even when a limited number of user objects are used or when a small number of still pictures are used.

When a still picture or a moving picture which has been already synthesized is used as a still picture or a moving picture serving as the original of the next synthesis of a still picture, plural user objects can be arranged in one synthetic moving picture.

In any case, in the image and sound reproduction system of the invention, a predetermined limited region which is in a background image and to be replaced is partially used for each frame, and hence an arbitrary synthetic moving picture can be obtained only by replacing a small number of arbitrary still pictures as a replacement material, without requiring any special operation. Consequently, even a person who has no special knowledge can easily replace a hero or heroine of a movie with the person or another actor or actress. Furthermore, the motion of the mouth of the hero in the background image can be made coincident with the voice of the person or another actor, and hence the person can enjoy an actor who speaks in the voice of the person.

Picture cards may be enjoyed in accordance with the progress of sound which is irrelevant to an image that serves as a background in a picture-card show.

In this way, the manner of enjoying the system can be further expanded as the number of combinations of objects to be entered is increased, and hence are substantially infinite. In the case of an image having information which is continuously changed, such as a moving picture, particularly, the system is very effective.

It is a matter of course that, when one frame is segmented from a moving picture image, such a frame may be used in synthesis with replacement of still pictures, for example, as a print seal in which a still picture is printed on the surface.

Next, embodiments of the image and sound reproduction system of the invention will be described with reference to the accompanying drawings.

First, relationships between the numbers indicating the means which have been described in the summary, and FIG. 1 will be described.

The number (1) is configured by a first still picture file group 114, moving picture file selecting means 103 for generating plural second still picture groups from a moving picture file group 102, moving picture/sound separating means 104, still picture file converting means 105, still picture synthesizing means 106, GI data generating means 112, and synthesis and reproduction controlling means 127.

The other numbers are configured similarly as follows.

The number (2) is configured by the above-mentioned number (1), and an input unit 142 for an n-th still picture other than a first still picture file.

The number (3) is configured so that plural second still pictures, and plural m-th still pictures other the second still pictures are contained in the same moving picture file group 102, and plural m-th still pictures which are set by the synthesis and reproduction controlling means 127 are selected.

The number (4) is configured so that the still picture synthesizing means 106 is controlled by the synthesis and reproduction controlling means 127 so as to set plural dummy objects in the second or m-th still pictures serving as a background, combine the first still picture or the n-th still picture with plural still pictures or the plural m-th still pictures in accordance with position information given to the dummy objects, and sequentially reproduce synthetic images.

The number (5) is configured by a dummy-still picture file group 109, dummy-file selecting means 110, dummy-object coordinate setting means 111, object coordinate comparing means 119, the first still picture file group 114, user object generating means 115, user mask setting means 116, user object displaying means 117, user object selecting means 118, and user object coordinate correcting means 120.

The number (6) is configured so that an arbitrary L-th dummy object other than the first dummy object and the user object is contained in the same dummy-still picture file group 109, and a part of the dummy object is generated by unit object generating means 138, and combined by unit object synthesizing means 139 so as to constitute a user object group 125, on the basis of GI data of GI data selecting means 113.

The number (7) is configured by the first still picture file group 114, the user object generating means 115, the dummy-file selecting means 110, the user object displaying means 117, the user object selecting means 118, user object image processing means 121, and the user object group 125.

The number (8) is configured by the moving picture file group 102, the moving picture file selecting means 103, and the still picture file converting means 105.

The number (9) is configured by the moving picture file group 102, the moving picture file selecting means 103, the moving picture/sound separating means 104, the still picture synthesizing means 106, moving picture converting means 129, and moving picture/sound synthesizing means 130.

The number (10) is configured by the moving picture/sound synthesizing means 130 and an external sound input 133.

The number (11) is configured by a first still picture input unit 136, the first still picture file group 114, the user object generating means 115, and the user mask setting means 116.

The number (12) is configured by the user mask setting means 116.

The number (13) is configured by the user object displaying means 117 and the user object selecting means 118.

The number (14) is configured by the user mask setting means 116, the user object displaying means 117, and the user object selecting means 118.

The number (15) is configured by the user object selecting means 118, three-dimensional user model generating means 123, two-dimensional rendering means 124, and the user object group 125.

The number (16) is configured by a chair 1902 on which an object sits, a display monitor 1903 fixed to the chair, and an imaging camera 1906.

The number (17) is configured by the user object group 125, story controlling means 137, and the moving picture/sound synthesizing means 130.

The number (18) is configured by the moving picture file selecting means 103, the synthesis and reproduction controlling means 127, and the moving picture/sound synthesizing means 130.

The number (19) is configured by voice recognizing means 140, the GI data selecting means 113, the moving picture file selecting means 103, the synthesis and reproduction controlling means 127, the still picture synthesizing means 106, the moving picture converting means 129, and the moving picture/sound synthesizing means 130.

The number (20) is configured by the GI data selecting means 113, the still picture synthesizing means 106, the moving picture converting means 129, the moving picture/sound synthesizing means 130, and moving picture recording means 132.

The number (21) is configured by the synthesis and reproduction controlling means 127, the GI data selecting means 113, the still picture synthesizing means 106, and still picture printing means 128.

The number (22) is realized by a feedback route from an output of the still picture synthesizing means 106 to a still picture input portion of the still picture synthesizing means 106.

The number (23) is realized by a feedback route from the moving picture/sound synthesizing means 130 to the moving picture file group 102. Alternatively, the configuration of the number (23) may be realized by feedbacking from the moving picture converting means 129 to the moving picture file group 102. In the case of feedback from the moving picture converting means 129, sound is not composed, and hence the process of separating sound in the moving picture/sound separating means 104 after feedbacking is not necessary.

FIG. 1 is a block diagram showing the configuration of an image and sound reproduction system of a first embodiment of the invention. Referring to FIG. 1, a moving picture file containing sound data which have been already recorded, such as a movie or a CG is input from a moving picture file input unit 101.

Plural moving picture files serving as a background image is captured into the moving picture file group 102. In the moving picture file selecting means 103, one moving picture file which is set by the synthesis and reproduction controlling means 127 that will be described later is selected from the moving picture file group 102, and then separated into a moving picture portion and a sound portion in the moving picture/sound separating means 104.

The moving picture file selecting means 103 is means for selectively setting a moving picture file selected when a background moving picture file is replaced, or means for setting a moving picture file selected by the story controlling means 137 which will be described later. The selected moving picture data are converted by the still picture file converting means 105 into a still picture file in which a frame number F is assigned to each of still pictures, and the file is supplied to the still picture synthesizing means 106. By contrast, the sound data separated in the moving picture/sound separating means 104 are supplied to the moving picture/sound synthesizing means 130.

Next, a dummy still picture used as a reference for the shape, the size, the position, and the like when a user object is combined with a background image is input from a dummy-still picture input unit 108. This is an objective to be combined, and, in a movie, an object such as a character, an automobile, or a house appearing in the movie. The dummy still picture input from the dummy-still picture input unit 108 is stored into the dummy still picture file group 109. In the dummy-file selecting means 110, an arbitrary dummy-still picture file is selected in accordance with dummy-file selection information which will be described later. In the dummy-object coordinate setting means 111, coordinate data indicating specific places such as the origin of a dummy object, and horizontal and vertical edges of an object which will be described later are given. The data are used as information for setting the shape, the size, the position, and the like of the dummy object when GI data are produced in the GI data generating means 112.

By contrast, plural still pictures of the user serving as the user data to be combined are input from the first still picture input unit 136, and then stored into the first still picture file group 114. In the user object generating means 115, the still pictures are converted into an object called a user object in which a predetermined portion of the first still picture to be combined is segmented from the background, and, in the user mask setting means 116, a mask is set on a portion of the user object which must be hidden, in the case of a person, portions other than the face, such as the body and the neck. In the case where a person is to be segmented from an image in a blue background or the like, when the body portion of a person is different in color from the background, the body is segmented together with the face. Therefore, a process of masking the body portion is necessary. The use of the user mask setting means 116 produces a merit that the person is not required to wear clothes of blue or the same color as the background.

Plural masks are set in the user mask setting means 116 so as to cope with various objects. Images in which the plural masks and the user object are combined with each other are displayed on the user object displaying means 117. While seeing the images in which the plural masks set in the user mask setting means 116 and the user object are combined, the user selects a user object which is segmented in the most adequate manner, through the user object selecting means 118.

The GI data in the embodiment are information for selectively controlling objects such as a background image which is a moving picture file serving as a data input source, dummy-object selection information D in the dummy-still picture file group 109 which is prepared as a photo of a provisional user object to be replaced with an object in the background image, X- and Y-coordinates indicating the position of the user object to be combined, the size S, and the frame number F of the background image.

When plural objects exists in the first still picture and a user object to be handled must be selected, for example, the position of the user object is deviated from that of the dummy object, and hence it is required to make the user object coordinates coincident with the dummy-object coordinates.

In the embodiment of the invention, therefore, the selected user object is processed in the following manner. The dummy-object coordinate setting means 111 supplies coordinate data of the user object corresponding to specific places such as the origin of the dummy object, and the user object, to the object coordinate comparing means 119 together with coordinate data of the origin, and horizontal and vertical edges of the dummy object. The difference between the coordinate data of the user object and those of the dummy object is corrected by the user object coordinate correcting means 120 so that the coordinate data of the user object always coincide with those of the dummy object. The corrected state is displayed on the user object displaying means 117.

When the center coordinates of the dummy object are originally set at the center of the dummy still picture, the user object coordinate correcting means 120 is required only to correct the center coordinates calculated from the horizontal and vertical edges of the user object, to the center of the first still picture. Therefore, the above-mentioned calculation is facilitated.

The user object coordinate correcting means 120 has a merit that it automatically corrects the coordinates when the user object to be handled and in the first still picture serving as the base of the user object is caused to be deviated from the center by camera shake in the imaging process.

In the user object image processing means 121, the user object is subjected to image processing including the followings. The shape of the user object is distorted so that the kinds of user objects are increased in number. A required obliquely left face of the user object is generated by horizontal inversion of an obliquely right face of the same user, so that the number of user objects is apparently increased while the number of processes of capturing a user object is reduced.

The three-dimensional user model generating means 123 produces a three-dimensional model of the user object from the user object consisting of two-dimensional image data, by three-dimensional model conversion which will be described later. The two-dimensional rendering means 124 generates image data other than the front of the user such as those in oblique directions of the user object, from the three-dimensional model of the user object.

In the user object group 125 which has been set as described above, the user object of the number which is set by the GI data in the still picture synthesizing means 106 is processed so as to be combined with a background still picture, and then supplied to the moving picture converting means 129. The synthetic still picture of the number which is set in the synthesis and reproduction controlling means 127 is supplied to the still picture printing (recording) means 128, and the synthetic still picture is printed.

From the GI data group generated by the GI data generating means 112, the GI data selecting means 113 selects the GI data corresponding to the reproduction story which is set in the synthesis and reproduction controlling means 127. The still picture synthesizing means 106 combines a background which is converted from the moving picture file of the corresponding story into a still picture, with the processed user object of the number which is set.

The synthetic image is supplied via the moving picture converting means 129 to the moving picture/sound synthesizing means 130 in which the image is combined with the acoustic data, and then supplied to a synthetic image output unit 131 in accordance with the reproduction sequence which is set in the synthesis and reproduction controlling means 127. When a monitor device is connected to the synthetic image output unit 131, the synthetic image can be displayed on the monitor device. The synthetic image is recorded by the moving picture recording means 132.

In accordance with the content information of the user object selected from the selected user object group 125, the story controlling means 137 selects the story coincident with the contents. The GI data selecting means 113 sets the GI data corresponding to the story. In this way, the story is selected in accordance with the kind and the number of the user objects of the user object group 125.

In the unit object generating means 138, a portion or a user object is segmented from the dummy-still picture file group 109. In accordance with the selected GI data, the unit object synthesizing means 139 combines the segmented user object with the portion of the user object which is selected by the user object selecting means 118, the portion corresponding to the segmented user object, and the synthetic user object is added to the user object group 125. As a result, when a desired user object showing the user who is speaking with opening the mouth is not contained in the first still picture, for example, a user object in which the user looks speaking can be configured by using an image in the dummy still picture and showing only the mouth portion.

In the embodiment of FIG. 1, an external sound signal is supplied to the voice recognizing means 140, and a control signal of the voice recognizing means 140 is sent to unit object selecting means 141 via the GI data generating means 112, whereby the mouth shape in the unit object and of the utterance manner corresponding to the external sound are automatically combined with the user object in the unit object synthesizing means 139. Therefore, the embodiment has a merit that labor of capturing first still pictures for utterance of the user at the number corresponding to the utterance manner of the user can be eliminated.

Similarly, when a sound signal from the moving picture file is supplied to the voice recognizing means 140 via the moving picture/sound separating means 104, the voice recognizing means 140 recognizes the utterance manner due to the sound signal in the moving picture file, and the mouth shape in a background moving picture file in the unit object and of the utterance manner corresponding to the sound is automatically combined with the user object in the unit object synthesizing means 139. Therefore, the embodiment has a merit that the labor of capturing first still pictures for utterance of user at the number corresponding to the utterance manner in a background moving picture file can be eliminated.

The GI data are supplied to a GI data output unit 134 or recorded by the moving picture recording means 132. Further GI data are captured from the outside by a GI data input unit 135, and desired GI data are selected by the GI data selecting means 113.

In the embodiment, the GI data include the position information of synthesis, and further include the followings: the number of the user object which is selected by the user object selecting means 118 in accordance with the dummy-file selection information; the number of the user object which is newly generated by the user object image processing means 121; the number of the user object which is generated from a three-dimensional model; the number of the user object which is generated in the unit object synthesizing means 139; the number of the user object of the mouth shape corresponding to the utterance of the user or the sound in a moving picture file; and user object size information which is set for a still picture of each user object. These data are stored and recorded in a predetermined suitable format, together with the frame numbers of still pictures. Furthermore, the story selection information based on the kinds and the number of the user objects, combination information of reproduction, and reproduction enabling information which is given when a certain point is attained in a game are stored and recorded in a predetermined format.

These sets of information at this stage may be recorded and sold as a software for a personal computer in the form of a DVD or a CD-ROM, or distributed by means of a network communication or the like.

The first still picture and the dummy object are configured by plural still pictures (information) which are obtained by image inputting means such as an electronic still camera or an image scanner.

In the still picture synthesizing means 106, a predetermined portion of the captured first still picture is pasted as an opaque image to each of still picture frames generated from a background moving picture file, on the basis of the GI data which are set so as to correspond to the dummy still picture. According to this configuration, the pasted still picture looks as if it automatically moves in accordance with a series of motions of a predetermined portion of the moving picture file. The above-mentioned expression of a predetermined portion of the still picture means a case where, for example, only the face or the lips are segmented from a rectangular still picture such as a photo of the face of a person. In the case where a circular still picture of a landscape is to be added to a rectangular moving picture of another landscape, for example, the whole of the circular still picture is pasted.

When the scene is changed or the target person is to be changed, a desired still picture other than the above-mentioned one is selected from plural still pictures, and the still picture is pasted in the same manner as described above with designating the correspondence between the predetermined portion of the moving picture file and the GI data. Specifically, for example, a photo of Mr. A which is a user object is combined with a background at the position of an arbitrary dummy object, in the following manner. The dummy-still picture file group 109 contains dummy objects which are respectively set at plural positions. Dummy-file selecting means 110 selects one of the dummy objects. The dummy-object coordinate setting means 111 sets the coordinates of the dummy object at the position of synthesis. The GI data generating means 112 generates data for setting the dummy object to be combined. The GI data selecting means 113 selects the dummy object. The still picture synthesizing means 106 combines the dummy object with the user object.

As described above, the image and sound reproduction system of the invention is configured so that, when a face portion of a background image is deemed as a background image object, position information indicative of the positions of the face and the mouth of the background image object, the number of the dummy object showing the direction of the face, and the like are indicated by one object selection information, a portrait of the user which is similar in face direction to the above is selected from plural still pictures, and the vertical length and the lateral width of the face are adjusted by scaling of the still picture.

Similarly, the mouth portion may be indicated also by the unit object selection information.

The external sound input 133 is used as a sound which, in synchronization with the motion of the mouth (or a sound generated from the mouth) of the person in the moving picture file group 102, is generated by another person, and often has contents which are different from words in the moving picture file group 102. In other words, although synchronization is required, any contents may be used as far as they can be ended within a predetermined time period and apparently synchronized with the motion.

The voice recognizing means 140 receives a sound signal, extracts vowels from the sound, converts the vowels into information of the mouth shape, and stores the information in a prefixed place and in a predetermined format. In this case, the mouth shape information is indicated by the position of the center of the mouth portion, positions at which the upper lip is divided into three portions at equal intervals, positions at which the lower lip is divided into three portions at equal intervals, the lateral width of the mouth, etc.

The unit object selecting means 141 selects the unit object corresponding to the information of the mouth shape.

According to this configuration, the pasted still picture automatically moves in accordance with a series of motions of the predetermined portion of the moving picture file.

As a result, the face portion of the movie is replaced with that of a different person, and the words are replaced with other words. The mouth motion is converted by inference on the basis of the sound information, and hence the converted mouth motion becomes natural.

Alternatively, a moving picture and sound file obtained from the moving picture/sound synthesizing means 130 may be returned to the moving picture file group 102, or the still picture synthesized by the still picture synthesizing means 106 may be returned to the still picture file converting means 105, and the new user object may be combined with the synthetic still picture. In the alternative, plural first still pictures can be disposed in one moving picture and sound file, i.e., user objects can be disposed in one screen.

Figure 2:
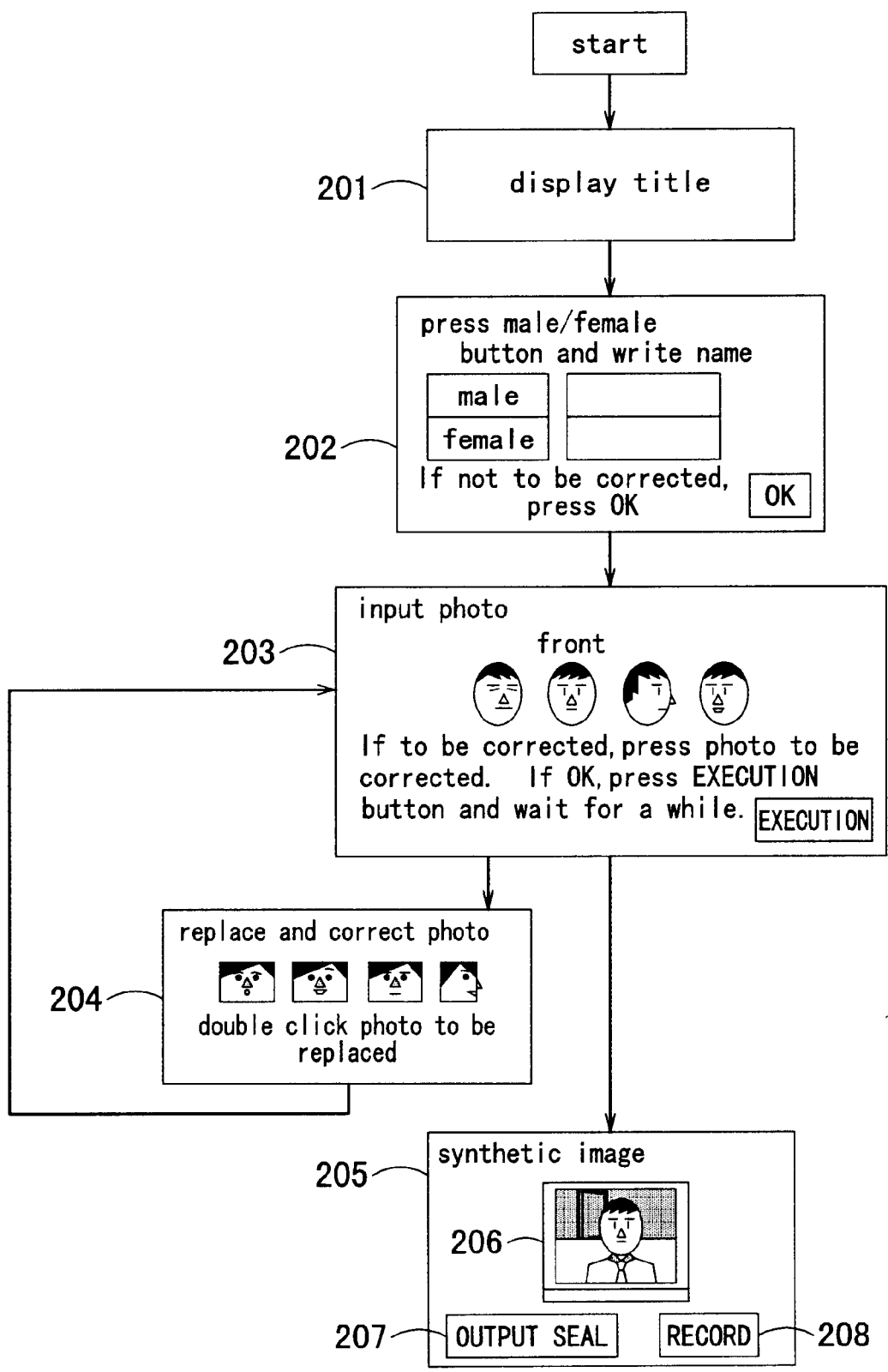
FIG. 2 is a flowchart showing the operation and the display configuration for the operation in the embodiment of the image and sound reproduction system of the invention.

FIG. 2 is a flowchart showing principal operation menus of the image and sound reproduction system of the invention. The reference numerals 201, 202, 203, 204, and 205 denote monitor screens for the operation by the user.

The monitor screen 201 is a screen for setting a title in the moving picture file serving as an original picture of the background. Plural screens through which characters to be searched are input or on which the initial screen or the title of plural moving pictures serving as an original picture of the background is indicted by an illustrative image or a text are displayed for each title.

The monitor screen 202 is a screen for selecting either of a male or a female to be set as a user object on which the user appears, by pressing a button, and for entering a name so as to be used as the name of the file of a synthetic image to be reproduced. The selection of either of a male or a female indicates means for selecting the kind of a user object or a dummy object and for reading the selected object. When the selection and the entered name are not to be corrected, the next monitor screen is displayed.

The monitor screen 203 is a screen showing a list of input states of the user photo. When the state of the user object at this stage is not preferable, for example, the imaging position of the user is largely deviated and the face of the user is hidden by a preset mask or the expression of the user or the like is to be changed, a photo to be replaced is selected by a method such as double clicking. Thereafter, the next correction screen is displayed.

The monitor screen 204 is a screen showing a list of plural photos which are previously taken for replacement. When a photo to be replaced is selected by a method such as double clicking, the photo is replaced with the photo selected on the monitor screen 203. Thereafter, the monitor screen 203 is again displayed.

The monitor screen 205 is a screen displayed by pressing the execution button after no further correction on the monitor screen 203 is required, and showing a synthetic image with the original picture on which the user appears. Buttons 206 for selecting a reproduction state of the synthetic image with the original picture on which the user appears are disposed in the monitor screen 205. The buttons 206 include buttons respectively having arbitrary functions such as continuous reproduction, repeated reproduction, combined reproduction, fast forward, rewind, still, and skip forward. A seal output button 207 and a record button 208 are disposed in the monitor screen 205. When the seal output button 207 is pressed while a screen of an arbitrary reproduction state is displayed, the screen is printed out, and, when the record button 208 is pressed, the screen is recorded on a disk or tape.

Figure 3:
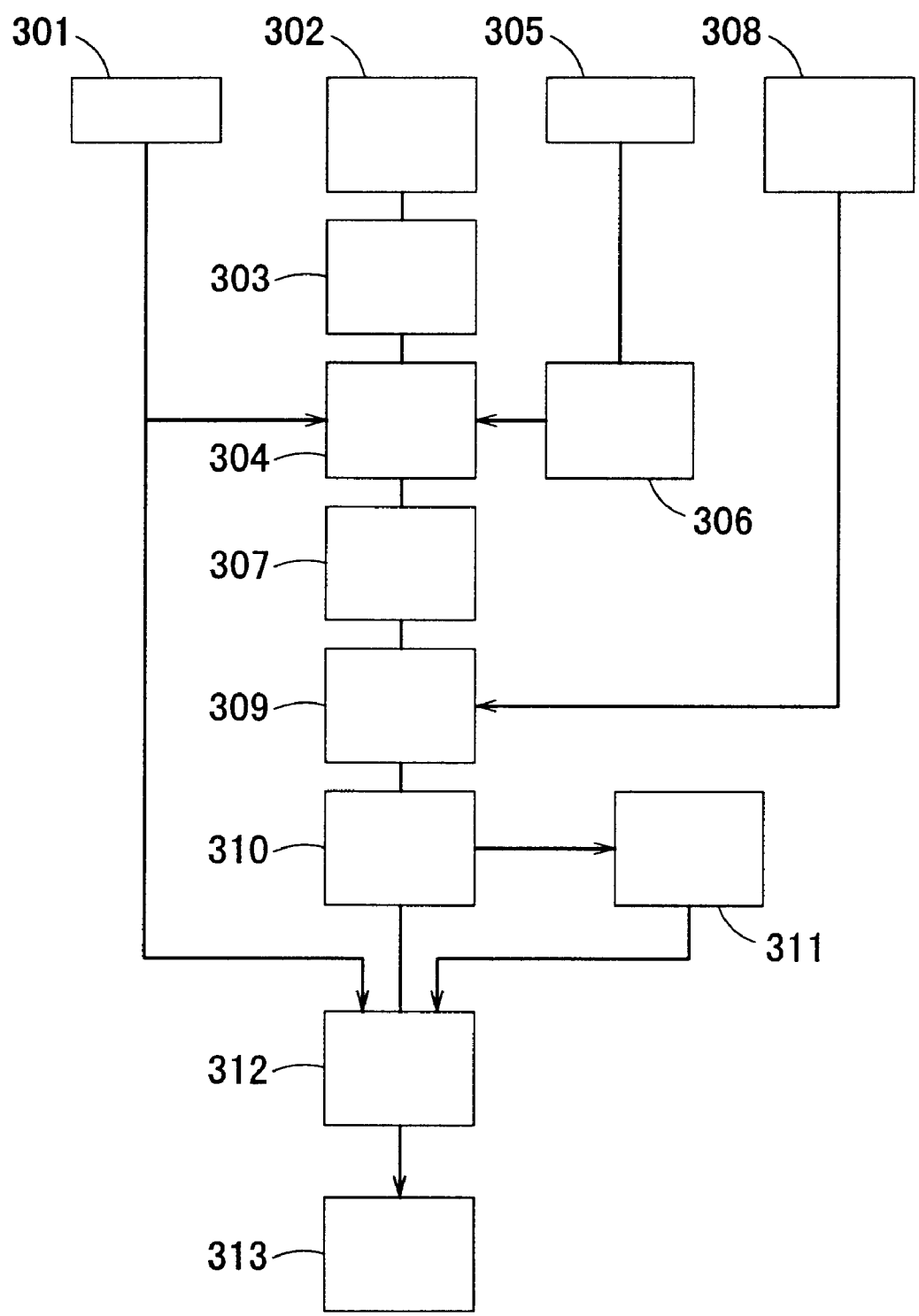
FIG. 3 is a block diagram showing the fundamental configuration and the operations of still picture synthesizing means 106, GI data generating means 112, and voice recognizing means 140 of an image and sound reproduction system in which the embodiment of the invention is specifically implemented.

FIG. 3 is a block diagram showing the operations of the still picture synthesizing means 106, the GI data generating means 112, and the voice recognizing means 140. An original picture 301 is a background image and consists of image frames output from the still picture file converting means 105. The reference numeral 307 denotes GI data output from the GI data selecting means 113, 309 denotes a user object selection unit, and 310 denotes a user object image process unit which image-processes the user object in correspondence with information such as the position information, the size, and the angle in the GI data. The reference numeral 303 denotes a dummy-object selection unit, and 304 denotes a GI data generation unit.

In a dummy-object setting unit 302, a dummy object is set which functions as a reference in place of the user object in synthesis in a background image. Specifically, while seeing the motion of the dummy object on a synthetic picture display unit 313, the dummy object is set so as to coincide with the background, in accordance with X- and Y-coordinates indicating the position of synthesis of the user object, the size S, the dummy-object selection information D indicating the direction of the dummy object and the mouth shape which are selectively set by the dummy-object selection unit 303, and sound selection information A from a voice recognition unit 306 for an original picture object which recognizes a sound produced by a background image object in a sound 305 of a background image separated from the moving picture/sound separating means 104.

In the GI data generation unit 304, the X- and Y-coordinates, the size S, the dummy-object selection information D, the sound selection information A, and the image frame number F are corresponded as user object selection control information (GI data 307). In this stage, a dummy object which is similar to the direction of the background image object, and the mouth shape are already corresponded.

Next, from the user object group 125, the user object selection unit 309 which is previously corresponded selects the user object corresponding to the position of the background image object, the direction of the face, and the shape of the mouth, on the basis of the GI data 307. Also in this case, in the same manner as the dummy object described above, a user object which is similar to the direction of the background image object, and the mouth shape are corresponded.

Next, the selected user object is image-processed in the following manner. In the user object image process unit 310, the position coordinates of the user object are set by using the X- and Y-coordinates, and the size of the user object is set by using the size S. A user object mask generation unit 311 generates a synthesis mask in which the portion other than the user object in the screen is transparent to the background image. The setting of the size of the user object may be performed by a method in which the size of the input still picture is used as an initial value and the size is directly scaled by using the size S, or that in which the input still picture is once uniformly set to have a reference size and the size is then scaled by using the size S.

It is a matter of course that, in order to set the transparent region of the synthesis mask, a process of setting unicolor pixels outside the region where pixels of the user object exist, and removing only the pixels is necessary.

In a still picture synthesis unit 312 (corresponding to the still picture synthesizing means 106 of FIG. 1), the thus obtained user object, and the synthesis mask in which the portion other than the user object in the screen is transparent to the background image are superimposed on the background still pictures output from the still picture file converting means 105, whereby the image object of the background of the background image, and the user object are apparently replaced and combined with each other.

Figure 4:
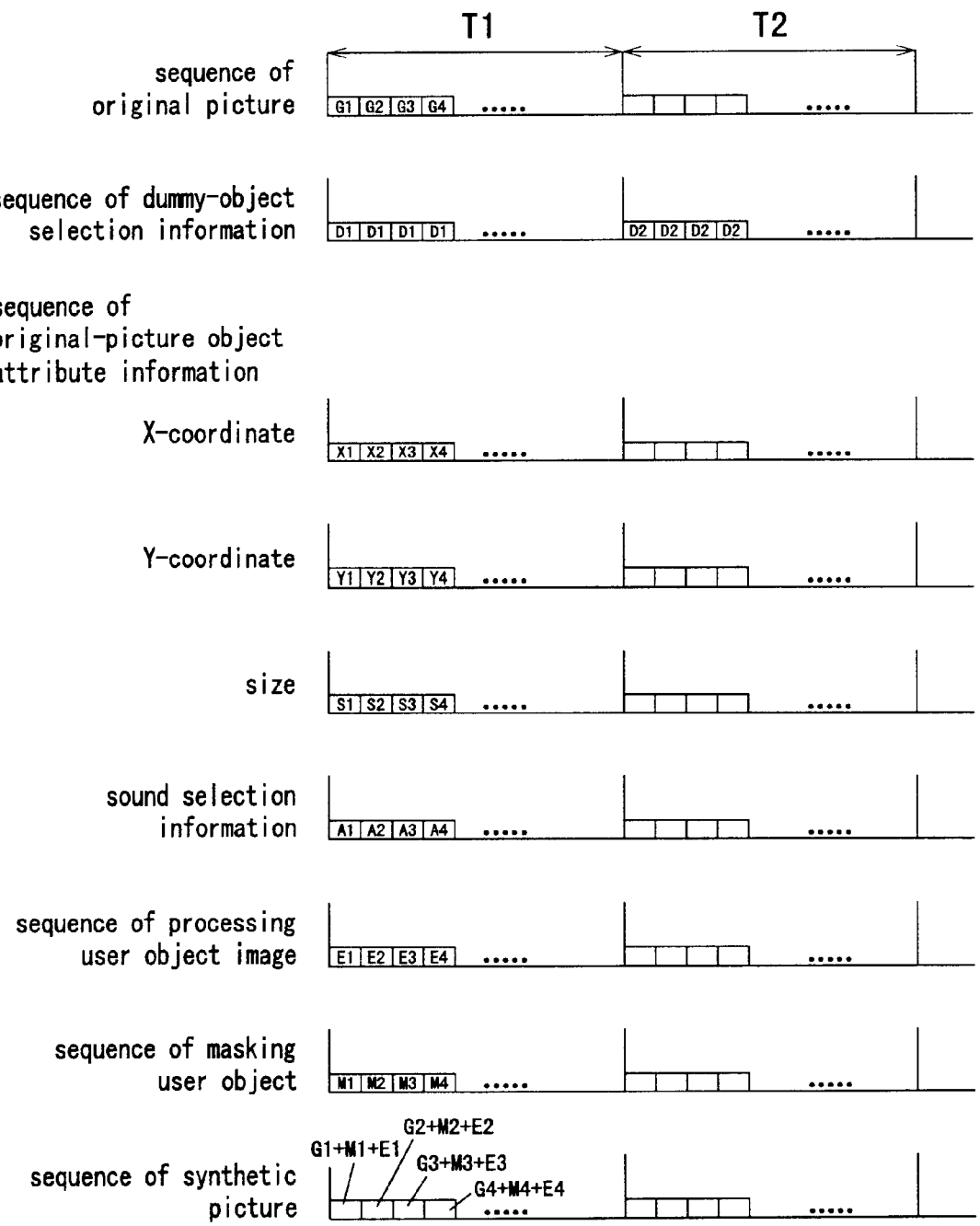
FIG. 4 is a time sequence diagram of the image and sound reproduction system in which the embodiment of the invention is specifically implemented.

FIG. 4 is a time sequence diagram showing the manner of image-processing of the time axes of the user object, the synthesis mask, the synthetic picture, and the like, by using the background still picture file as an original, and the GI data configured by the dummy-file selection information, the synthesizing position information, etc. The image frames of the background image are respectively indicated by G1, G2, . . . (sequence of original picture). Among the image frames G1, G2, . . . , zones in which the face direction, the expression, and the mouth shape of the object in the background image are changed so small that it is not required to change the selection of the user object to be replaced are partitioned. The zones are respectively indicated by T1, T2, . . . , and the sets of dummy-file selection information are indicated by D1, D2, . . . (sequence of dummy-object selection information).

In each frame, the position coordinates and the sizes of dummy objects in the GI data are indicated by X1, X2, . . . Y1, Y2, . . . , and S1, S2, . . . , respectively (sequence of GI data).

Next, the size of the user object selected by the user object selecting means 118 is adjusted in accordance with the information of the sizes S1, S2, . . . , and the coordinates of the user object are set so as to be coincident with the position coordinates X1, X2, . . .

Similarly, with respect to the sound selection information of the voice recognizing means 140, frame sequences which are changed in accordance with vowels are set to be sound selection information A1, A2, . . . respectively.

Among the thus obtained GI data for each frame, the user object corresponding to the sound selection information A1, A2, . . . is selected.

The frames of the user object which is image-processed as described above are set to be screens E1, E2, . . . (sequence of processing user object image). Similarly, the synthesis mask which is transparent to the background image is set in the remaining region of the user object which is set in the screens E1, E2, . . . , and respectively set as M1, M2, . . . (sequence of synthesis mask).

The user object E and the synthesis mask M which are obtained in this way are superimposed on the background image G, and G+M+E is output for each frame (sequence of synthetic picture). Specifically, the output is performed as G1+M1+E1, G2+M2+E2, G3+M3+E3, . . .

Figure 5:
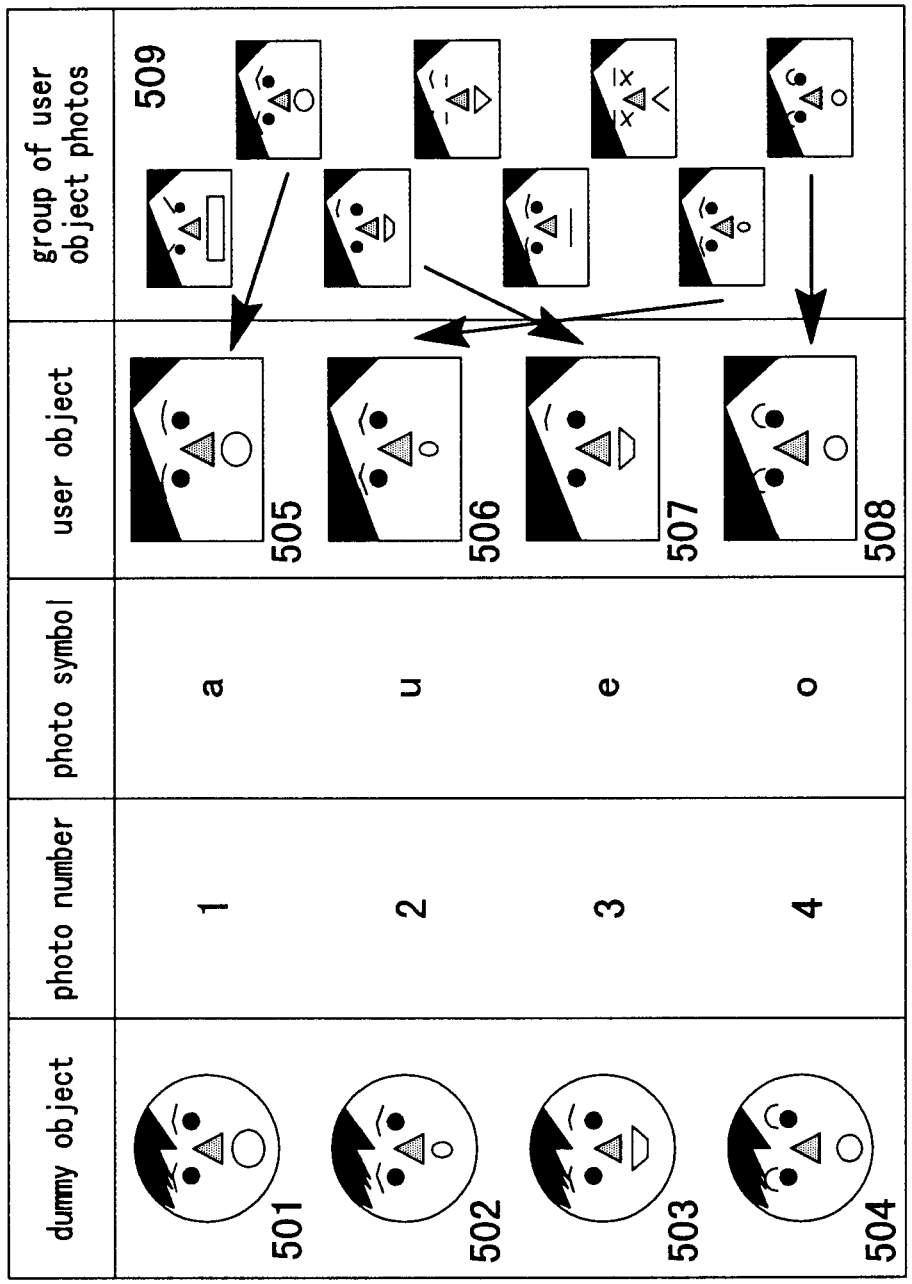
FIG. 5 is a schematic view showing a user object selection unit of the image and sound reproduction system in which the embodiment of the invention is specifically implemented.

FIG. 5 is a schematic view showing the user object selection unit of the user object selecting means 118. In FIG. 5, dummy objects uttering "a," "u," "e," and "o" are denoted by 501, 502, 503, and 504, respectively, and user objects which are selected from the user object group 125 so as to correspond to the dummy objects 501, 502, 503, and 504 are indicated by 505, 506, 507, and 508, respectively, so as to correlate the objects.

Through the user object selection unit 309, the user selects photos which resemble the dummy objects 501, 502, 503, and 504 as much as possible, from the user object group 125. For example, a photo resembling a dummy object uttering "a," i.e., the dummy object 501 is selected from a user object photo group 509, and, as the user object 505, placed adjacent to the dummy object 501 uttering "a." The object is indicated by a photo number "1" or a photo symbol "a."

Similarly, photos resembling dummy objects uttering "u," "e," and "o," i.e., the dummy objects 502, 503, and 504 are selected from the user object photo group 509, and, as the user objects 506, 507, and 508, placed adjacent to the dummy objects 502, 503, and 504 uttering "u," "e," and "o," respectively. The objects are indicated by photo numbers "2," "3," and "4" or photo symbols "u," "e," and "o," respectively.

Table 1 below shows an example of the GI data configured as the object control information for selecting a user object including the sound information of the background image object. In Table 1, with respect to continuous still picture frame numbers F, examples of the photo number D of the dummy object, the photo symbol A of the user object, vertical and lateral coordinates X and Y as the position where the user object is to be placed, and the size S of the user object are shown.

TABLE 1

| Frame number F | Photo number D of dummy object | Photo number A of user object | Coordinate x of user object | Coordinate Y of user object | Size S of user object |
|---|---|---|---|---|---|
| 0001 | 3 | e | 21 | 56 | 6 |
| 0002 | 3 | e | 21 | 56 | 6 |
| 0003 | 4 | o | 22 | 56 | 5 |
| : | 4 | o | 22 | 56 | 4 |
| : | 1 | a | : | 57 | 2 |
| : | 1 | a | : | 57 | −1 |
| : | 1 | a | : | : | −3 |
| : | 2 | u | : | : | −4 |
| : | 2 | u | : | : | : |
| : | 2 | u | : | : | : |

In the above description, in the case of a person, the user object photo group consists of only a group of photos of Mr. A. Alternatively, in addition to Mr. A, the photo group may includes Mr. B, Ms. C, D, and E, dogs, clothes and hair styles of a certain person, landscapes, etc. When a photo which is not directly related to the dummy object is used as an object in synthesis, there arises a feature that a funny effect (a special effect in a movie) which arouses an interest of a viewer is obtained.

Figure 6:
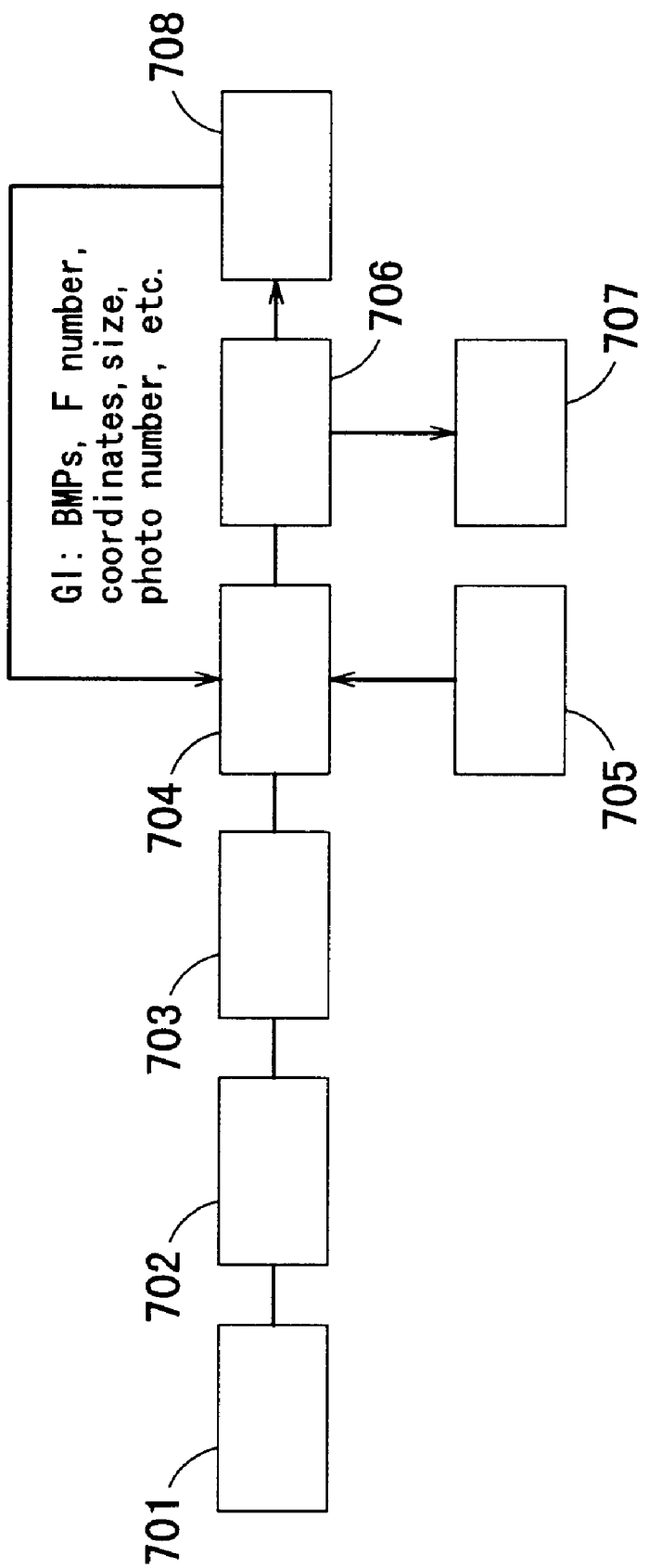
FIG. 6 is a diagram showing steps of producing GI data in the image and sound reproduction system in which the embodiment of the invention is specifically implemented.

FIG. 6 specifically shows the configuration of the GI data generating means 112 of the embodiment of the invention, and steps of producing the GI data. Referring to FIG. 6, 701 denotes a background original picture capture unit, 702 denotes a moving picture edition unit, 703 denotes a background original picture frame production unit, 704 denotes an image process file setting unit, 705 denotes a dummy-object selection unit, 706 denotes a GI data edition unit, 707 denotes a preview unit, and 708 denotes a GI data output unit.

An original picture image which is a continuous moving picture and serves as a background is captured by the background original picture capture unit 701. The moving picture edition unit 702 performs an editing process in which a portion to be subjected to object replacement, and portions such as the periphery which are required in a finally completed image and sound are connected to each other, and the other portions are abandoned. In the background original picture frame production unit 703, the thus edited moving picture is decomposed and converted into frame files which are still pictures. In this case, it is a matter of course that a sound contained in the background original picture image must be edited in accordance with the edition of the frames.

On the other hand, the dummy-object selection unit 705 selects plural photos which resemble faces at plural directions of the background image object are selected from the dummy object group, as dummy objects which are set in place of a background image object to be replaced. The selected photos are previously set in the image process file setting unit 704.

In the image process file setting unit 704, the GI data such as the photo number D, the coordinate X, the coordinate Y. and the size S are fed back from the GI data output unit 708. On the basis of the data of D, X, Y, and S, the object in the photo number D (the dummy object is previously subjected to a voiding process for a blue-back processing window, so that only an object exists) is image-processed into an object of the coordinates X and Y and the size S. The object is combined with the background image frame, in the GI data edition unit 706. It is possible to check the image in the preview unit 707.

In the GI data edition unit 706, in order to determine one of the dummy object photos as the replacement edition target which is suitable for the screen, the number D of the dummy object is selected, the vertical and lateral coordinates X and Y (in the case of a CG, also the depth coordinate Z is included) are set as the position where the user object is to be placed, and the size S of the user object is set, while seeing the screen of the preview unit 707. The GI data edition unit 706 is configured so as to edit the photo number D, the coordinates X and Y, and the size S which are set as described above, in correspondence with the number of the background image frame together with the background image frame.

In the GI data edition unit 706, the photo number D, the coordinates X and Y, and the size S are set into a file together with the number of the background image frame, as GI data, and a synthetic image of a dummy object which is image-processed so as to have the predetermined coordinates X and Y and size S, and the background image file are supplied to the preview unit 707.

A result of the above process is checked in the form of a moving picture in the preview unit 707. If no change is to be done, the result is supplied to the GI data output unit 708.

When a series of output data which are obtained as described above, such as the dummy object number D, the coordinates X and Y, the size S, and the background image frame number F are stored on a record medium such as a disk, also later synthesis using another n-th object, or synthesis in which plural objects are superimposed to one another are enabled. The GI data are produced in accordance with the voice, the story, and funness.

Figure 7:
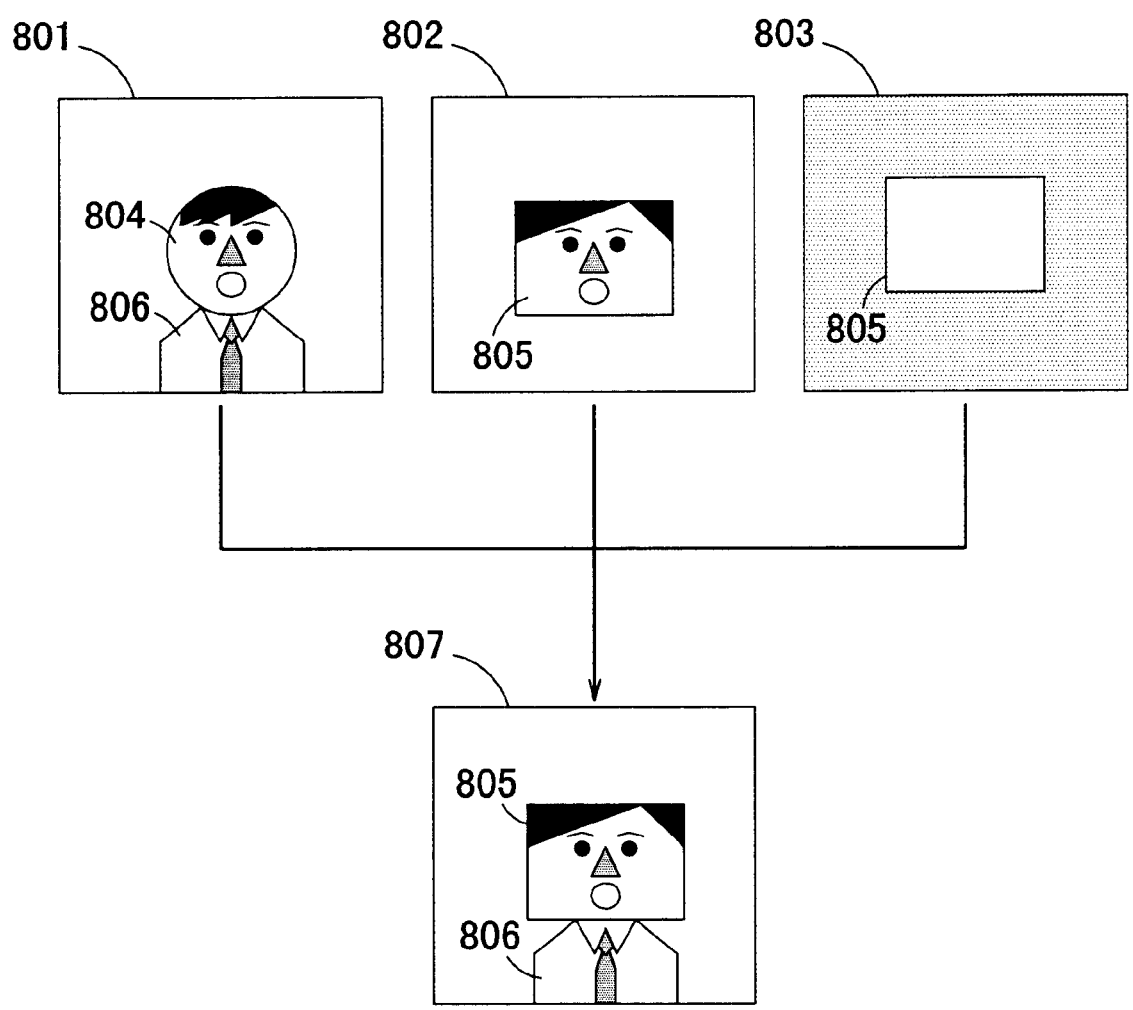
FIG. 7 is a diagram showing steps of generating a synthetic picture in the image and sound reproduction system in which the embodiment of the invention is specifically implemented.

FIG. 7 is a diagram showing steps of generating a synthetic picture of a user object and a background original picture image. In FIG. 7, a transparent mask 803 for synthesis is shown in which the region other than a face region 805 in a user object 802 is transparent to a background image 801, in order to superimpose the face region 805 in the user object 802 on a face region 804 in the background original picture 801. A transparent mask means a bit map file in which no pixel data exists and only a frame exists. A transparent mask may be realized in one of the following methods. Such a masking function is realized in the form of a file as an independent file. Alternatively, an independent file is not be set, and pixel data of the background image 801 are directly written into the region of a frame memory such as a video memory, other than the face region 805 in the user object 802.

In any case, when the user object 802 is superimposed on the transparent mask 803 in which the region other than the face region 805 in the user object 802 is apparently transparent and the background original picture 801 is superimposed below the mask, a synthetic image 807 containing a body portion 806 of the background image object is generated.

In the preview unit 707 of FIG. 7, it is required only to check the synthesis result, and hence the transparent mask 803 is not necessary to be stored for each frame. In order to enhance the efficiency of the GI edition, therefore, the method is preferable which uses synthesizing means for directly writing pixel data into a frame memory such as a video memory without setting the transparent mask 803.

In the case of a CG, only the face 804 in the background original picture 801 is not displayed, and the body 806 is displayed in the background original picture 801. In a pasting process such as texture mapping, therefore, it is required only to replace the pasting of the face 804 in the background original picture 801 with that of the face region 805 in the user object 802.

Figure 8:
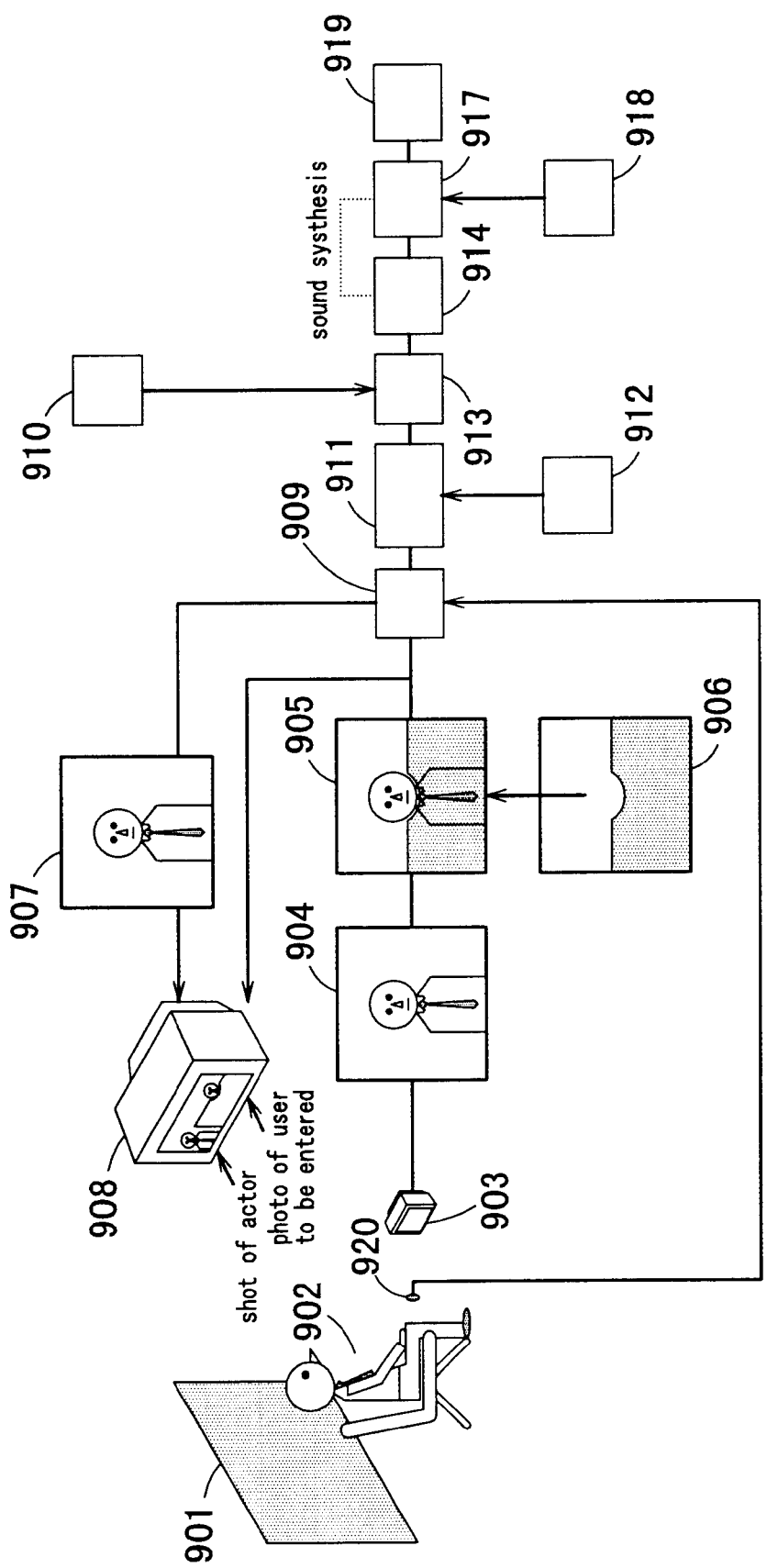
FIG. 8 is a diagram showing steps of producing an image in the image and sound reproduction system in which the embodiment of the invention is specifically implemented.

FIG. 8 specifically shows steps of producing an image in the embodiment of the invention, and is configured by a blue background 901, a user 902, a camera 903, a background voiding unit 904, a window process unit 905, a window picture generation unit 906, a dummy object (or a shot of an actor) 907, a monitor 908, a user object setting unit 909, an original picture input unit 910 for inputting a background original picture image, a GI file image process unit 911, a GI data input unit 912, a synthesis unit 913, a moving picture setting unit 914, an AV data production unit 917, a sound input unit 918, and an output monitor unit 919.

The blue background 901 is a background of one color such as blue. When the background of the user 902 is taken by the camera 903 with one color such as blue, the blue background is used for a process in the background voiding unit 904 to eliminate only blue pixel data serving as the background color so that the background becomes transparent. In order to extract the portion of the face of the user, a window for eliminating the body portion is previously prepared by the window picture generation unit 906. In the window process unit 905, the window generated by the window picture generation unit 906, and the user photo in the background voiding unit 904 are combined to each other, and the images are supplied to the monitor 908. Also the dummy object 907 serving as an imaging target which is previously set in the user object setting unit 909 is displayed on the monitor 908. The user 902 adjusts the direction of the face and the expression of the user in accordance with the direction of the face and the expression of the dummy object 907. When the adjustment is completed, the user 902 presses an shutter 920. Alternatively, in place of the dummy object 907, the shot of an actor which is an object in the background original picture image may be displayed on the monitor 908. The alternative may be more convenient for the user 902. In the embodiment, either of these methods may be employed.

In the thus obtained user photo, only the face portion is extracted, and the state of the face portion is coincident with the dummy object 907 which is the target, or the expression and the direction of the face of the actor which is an object in the background original picture.

In this way, one or more dummy objects 907 which are displayed on the monitor 908, and user photos corresponding to the dummy objects are supplied from the user object setting unit 909 to the GI file image process unit 911, at a number required in synthesis. Then, the GI data which are previously generated and stored in the GI data generating means 112 of FIG. 6 are supplied through the GI data input unit 912, and the data are set into a file for each frame in the GI file image process unit 911.

The synthesis unit 913 reads out the thus prepared files from the memory, and receives the background image which has been edited and formed as a file in the background original picture frame production unit 703 of FIG. 6, through the original picture input unit 910. As described with reference to FIG. 7, image synthesis is performed in accordance with the frame numbers in the GI data. In the moving picture setting unit 914, the synthesis frames are formed into one continuous moving picture file. The AV data production unit 917 combines the moving picture file with the sound contained in the background original picture image supplied through the sound input unit 918.

In this way, the synthesized moving picture is generated as one image/sound data and supplied to the output monitor unit 919 together with the sound.

Next, the case where a voice of the user is supplied from the output, the process of imaging a still picture is controlled in accordance with the voice, and the original voice contained in the background original picture image is replaced with the user voice will be described.

Figure 9:
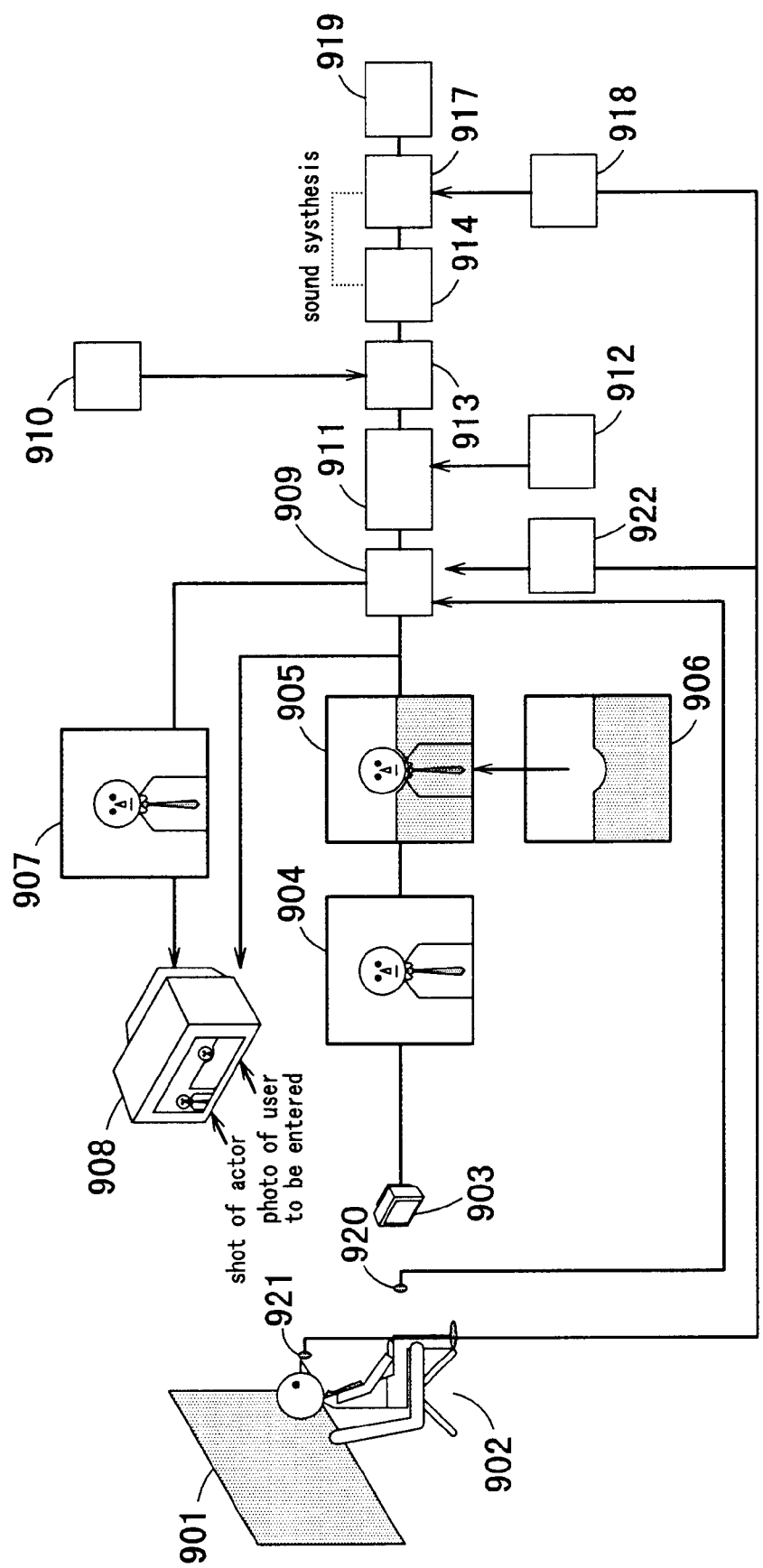
FIG. 9 is a diagram showing steps of producing an image in another image and sound reproduction system in which an example of using the voice of the user is specifically implemented in the embodiment of the invention.

In FIG. 9, components having the same configuration as those of FIG. 8 are denoted by the same reference numerals. FIG. 9 is configured by the whole configuration of FIG. 8, a microphone 921, and a voice recognition unit 922.

The portions other than the portion for recognizing the voice of the user are configured in the same manner as FIG. 8, and hence only the process for the voice of the user will be described with reference to the drawings.

The voice recognition unit 922 of FIG. 9 is realized by a voice recognition software which is sold in the form of a software for a personal computer, or hardware such as a voice recognition board. When the user 902 utters "a," the voice recognition unit 922 recognizes "aa" through the microphone 921. The symbol "a" is supplied to the user object setting unit 909. The preset dummy object uttering "a" is displayed on the monitor 908. The image which is taken in response to the pressing of shutter 920 by the user is converted into an image of only the face uttering "a" serving as a user object by background voiding and window processes, and then supplied to the GI file image process unit 911.

The process of imaging a still picture of the user is performed while controlling the display of a dummy object on the monitor 908 in accordance with the voice of the user as described above. Thereafter, synthesis of an image and formation of a moving picture are performed in the same manner as the embodiment of FIG. 8. In this case, in the original picture image frame containing a dummy object uttering "a," utterance of "a" by means of the voice of the user is combined in the AV data production unit 917 through he sound input unit 918, with an image corresponding to the frame number of the GI data, so that the original voice contained in the original picture image is replaced with the user voice.

In place of directly using a signal of actual recording of the voice of the user, a text signal or a MIDI (Musical Instrument Digital Interface) signal may be supplied, and an artificial voice may be generated by voice synthesis using the signal. The artificial voice may be combined with the image.

FIG. 10 is a diagram illustrating the operations of the moving picture/sound separating means 104, the still picture file converting means 105, and the moving picture/sound synthesizing means 130 in the image and sound reproduction system of the invention, and showing a manner of processing files in separation of an image and sound file, formation of a synthetic image as a moving picture, and combination with a sound file.

In FIG. 10, (1) shows a moving picture file containing sound data, (2) shows an audio data group which is separated by the moving picture/sound separating means 104, (3) shows a still picture file data group obtained in the still picture file converting means 105, (4) shows a user object data group, (5) shows a GI data group, and (6) shows a synthetic moving picture file in which the sound data and the synthesis frame are combined into one file.

In the moving picture/sound separating means 104, the moving picture portion (frames 1 to m) and the sound portion contained in the moving picture file (1) are separated from each other. Since the sound portion is configured by a continuous signal, the portion is appropriately partitioned into data files per unit time period, or audio 1 to m. The moving picture data (moving picture portion) are converted by the still picture file converting means 105 into the still picture file data group (3) in which the frame number F is assigned to each still picture, and then supplied to the still picture synthesizing means 106. On the other hand, the user object data group (4) is combined with the still picture file data group (3) on the basis of the position information of the GI data group (5) and the user object selection information, and converted by the moving picture/sound synthesizing means 130 together with the audio data group (2) in which synthesis frames 1 to m are separated by the moving picture/sound separating means 104, into one synthesis moving picture and sound file. The means for separating sound data from a moving picture file or for combining them into one data file is realized by a method known as a usual data file process on a computer. Therefore, detailed description of the means is omitted.

Figure 11:
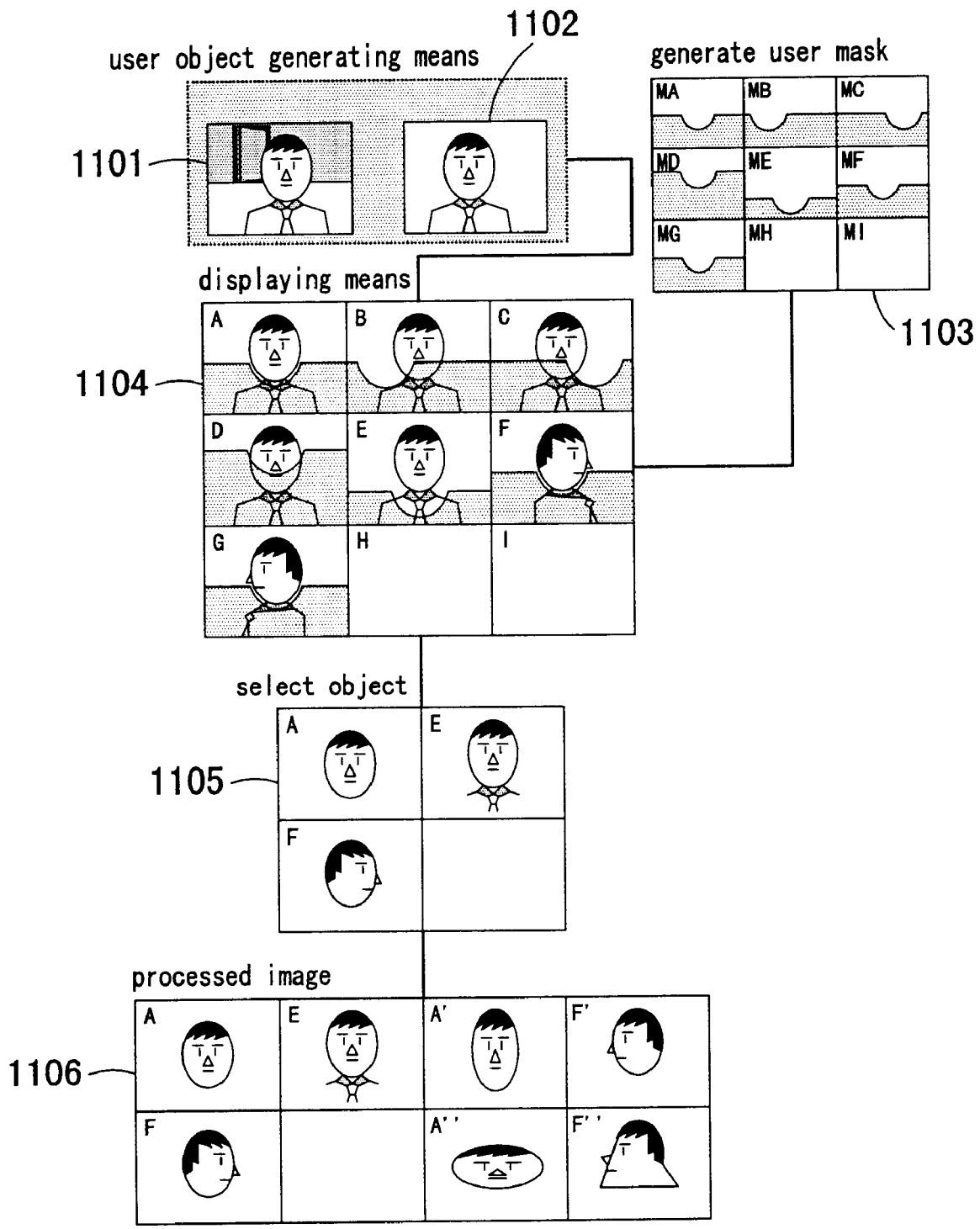
FIG. 11 is a block diagram showing the configuration of user object generating means 115 in the invention.

FIG. 11 is a block diagram specifically showing the configuration of the user object generating means 115 in the invention. In FIG. 11, 1101 denotes a still picture file of a person and containing a background.

The reference numeral 1102 denotes a still picture file in which the person is eliminated and the background is removed away from the still picture file 1101.

The reference numeral 1103 denotes a mask still picture file group which is preset in the user mask setting means 116, and which consists of masks MA to MI. Synthetic images which are obtained in this stage by combining the still picture file 1102 with the masks MA to MI of the mask still picture file group are displayed on the user object displaying means 117, as a mask synthesis still picture file group 1104. In this stage, the user can selects one of the masks MA to MI which seems to mask the body portion in the best manner so as to obtain a user object consisting only of the face, while observing the still pictures. Furthermore, the selection can be done with setting the expression of the user so as to be in a better state.

Thereafter, user objects which are selected from the mask synthesis still picture file group 1104 are displayed as a selected still picture file group 1105 which is a set of selected objects.

In the embodiment, the method has been described in which the GI data are indicated by the position information of the face, the mouth, or the like of a dummy object, the direction of the face is indicated by the selection information such as a photo number or a symbol, and a portrait which is similar in direction to the selection information is selected from plural still pictures, and the position and the size are controlled. In order to match a still picture with a background image in a more appropriate manner or increase kinds of still pictures to provide abundant changes without imaging still pictures of various angles, control data for changing brightness, color tone, or shade of a still picture, and images which are obtained by inverting horizontally or vertically a photo in profile may be produced to obtain GI data by usual image processing. This also can be realized in the user object image process unit 310 of FIG. 3 by using a similar method as the method which has been described in the embodiment and in which a still picture is selected and the position, the size, and the like are controlled.

An example of the above is shown in a newly produced still picture file group 1106 of FIG. 11. The still picture file group 1106 shows still pictures which are obtained by distorting a user object or newly generated as profiles, namely a funny face A' in which a user still picture A after masking is vertically extended, a funny face A" in which the user still picture is horizontally extended, a left profile F' which is obtained by horizontally inverting the right profile F, and another left profile F" which is obtained by deforming the left profile into a triangular shape.

The above-mentioned methods (morphing) in which brightness, color tone, or shade of a still picture are changed or images are produced by inverting horizontally or vertically a photo in profile is similar to methods such as that in which, when a user object is to be contracted or expanded, pixels constituting the object are decimated or a lacking pixel region is interpolated by producing interpolating pixels. The methods can be realized by changing coefficients of the color histogram function, or inverting pixels laterally or vertically. Therefore, the system has a feature that, when such a process is applied to still pictures, a moving picture can be produced even in the case where photos of a new object are small in number.

Such an image process can be executed by the image process file setting unit 704 of FIG. 6 in the case of edition of GI data, and by the GI file image process unit 911 of FIGS. 8 and 9 in the case of production of a synthetic moving picture.

The setting of the series of files, synthesis by writing into the memory and the like, a compression calculation for data synthesis with a sound, a control of an image, and the like can be executed by using a computing device such as a personal computer which is usually used, or a dedicated synthesis computing device, and a record medium such as a semiconductor memory or a disk.

Figure 12:
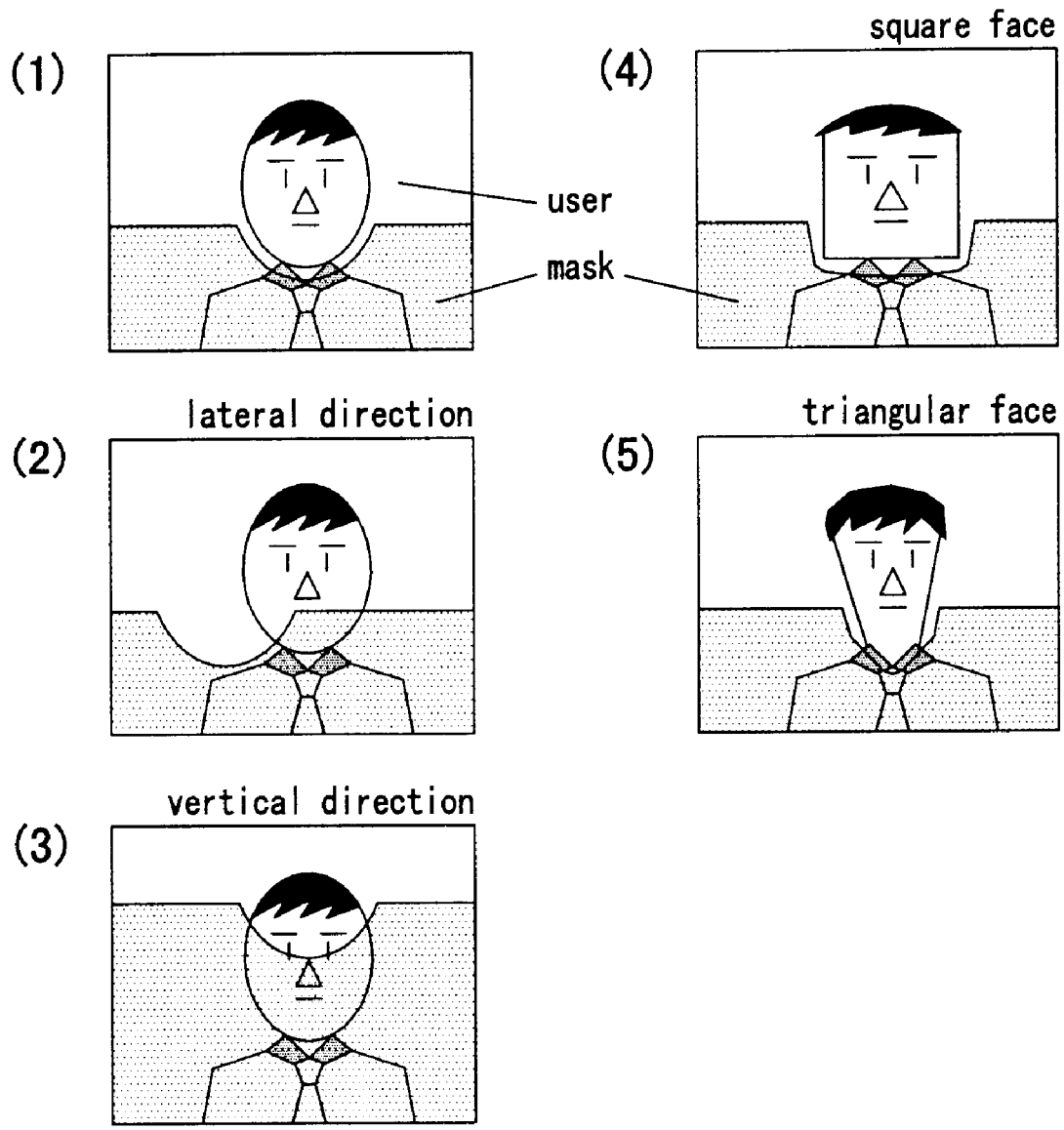
FIG. 12 is a diagram showing setting of user mask setting means 116 for hiding a portion of the body of the user, and a state where a user mask is deviated from an appropriate position of the user.

FIG. 12 is a diagram showing the setting of the user mask setting means 116 for hiding a portion of the body of the user, and a state where the user mask which is set in the user object displaying means 117 is deviated from an appropriate position of the user or the imaging position of the user is deviated with respect to the position of the user mask.

Specifically, (1) of FIG. 12 is one of still pictures which, after imaging of the user is performed, are captured from the first still picture input unit 136 into the first still picture file group 114. In the still picture, the background is deleted by the user object generating means 115 and the face and the body of the user are displayed. In (1), the user mask which is set in the user mask setting means 116, and the face and the body of the user are combinedly displayed, and their positional states are proper.

In (2) and (3) of FIG. 12, the user mask which is set in the user mask setting means 116, and the face and the body of the user are combinedly displayed, but the user mask is deviated in a lateral or vertical direction. When the face and the body of the user are hidden by using the user mask as it is, therefore, the face and the body of the user partly disappear. In this case, while observing this state through the user object displaying means 117, the user moves the body so as to match with the mask, or sets another mask which match with the face and the body.

In (4) and (5) of FIG. 12, the face has a square or triangular shape. When the preset user mask has a semicircular shape such as shown in (1) of the figure, a part of the face disappears. Therefore, a user mask which has a square or triangular cutaway portion is additionally set, and such a user mask and the face and the body of the user are combinedly displayed.

Figure 13:
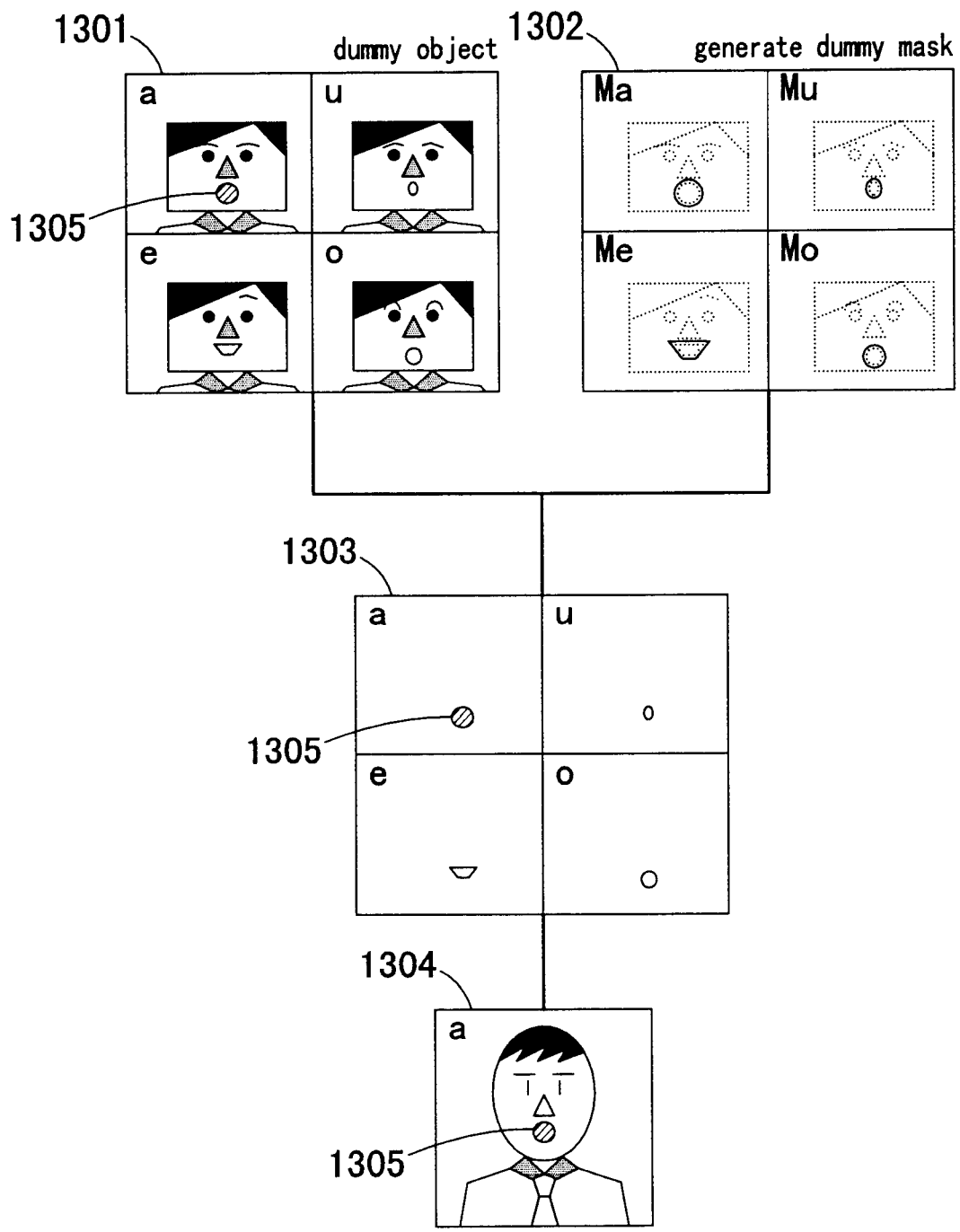
FIG. 13 is a diagram illustrating the operations of unit object generating means 138, unit object synthesizing means 139, and unit object selecting means 141.

FIG. 13 is a diagram illustrating the operations of the unit object generating means 138, the unit object synthesizing means 139, and the unit object selecting means 141 which are used for replacing images of the mouth portion of dummy objects uttering "a," "u," "e," and "o" with the motion image of the mouth of the user. In FIG. 13, 1301 denotes dummy objects respectively uttering "a," "u", "e," and "o." The reference numeral 1302 denotes dummy object masks for extracting the mouth portions of the four dummy objects 1301. Each of the masks has a window which is formed so that the screen region other than the mouth portion is hidden. In correspondence with the vowels of "a," "u," "e," and "o," the masks are indicated by symbols Ma, Mu, Me, and Mo, respectively.

Under the state configured as described above, an object is obtained by hiding the screen region of the dummy object 1301 other than the mouth portion by the dummy object mouth 1302. Such an object is called a unit object 1303. For example, the mouth portion 1305 of the dummy object 1301 uttering "a" is combined with the first still picture of the user, and an obtained unit synthesis object 1304 is supplied to the user object image processing means 121 in the next step.

In the thus obtained unit object 1303, the mouth portion in the dummy-still picture file is extracted and then combined with that of the user object which is set from the first still picture of the user. Even when the still picture of the user is not in the state uttering "a," "u," "e," or "o," a user still picture which looks containing a motion of the mouth can be used.

The motion of the mouth can be realized in the following manner. The voice recognizing means 140 recognizes a vowel of a sound portion of a movie containing a motion of the mouth, and the unit object selecting means 141 selects the unit object corresponding to the vowel. For example, the unit object 1303 uttering "a" is output as the unit synthesis object 1304. Such unit objects are not restricted to various mouth shapes in the case where the face is directed to the front. With respect to the motion of the mouth in portrait, the direction of an eyeball, the motion of an eyelid, and the like, when a part of an image in a dummy object is previously used, similarly, labor of taking plural photos of the user can be omitted.

The selected unit object selection number or voice recognition number is stored together with the GI data in a prefixed place and in a predetermined format.

FIG. 14 is a diagram illustrating the operations of the object coordinate comparing means 119, and the object coordinate correcting means 120. In FIG. 14, (1) shows the dummy-object coordinates having an origin at $O_D$, and (2) shows the user object coordinates having an origin at $O_u$. Referring to the figure, in the dummy-object coordinates of (1), the object coordinate comparing means 119 sets an object which has a coordinate origin at the origin $O_D$ that is set by the object coordinate setting means 111, and which does not have a background, with setting coordinates x and y serving as a reference of the object to be $x_D$ and $y_D$, the minimum and maximum values in the horizontal direction as $x_1$ and $x_2$, and the minimum and maximum values in the vertical direction as $y_1$ and $y_2$.

Similarly, in the user object coordinates of (2), the object coordinate comparing means 119 sets an object which has a coordinate origin at the origin $O_U$ that is set by the object coordinate setting means 111, and which does not have a background, with setting coordinates x and y serving as a reference of the object to be $x_U$ and $y_U$, the minimum and maximum values in the horizontal direction as $x_3$ and $x_4$, and the minimum and maximum values in the vertical direction as $y_3$ and $y_4$.

These coordinates are detected by the object coordinate comparing means 119 by a usual technique or detection of edges of the object in an image of the reference coordinates $x_D$, $y_D$, $x_U$, and $y_U$, and calculated by the following expressions:

$$(x_2-x_1)/2=x_D,$$

$$(x_4-x_3)/2=x_U,$$

$$(y_2-y_1)/2=y_D,$$

$$(y_4-y_3)/2=y_U.$$

When the reference coordinates $x_U$ and $y_U$ of the user object or the coordinate origin $O_U$ of the user object is moved by distances corresponding to the differences $x_T=x_D-x_U$ and $y_T=y_D-y_U$, the reference coordinate $O_U$ of the user object coincides with the reference coordinate $O_D$ of the dummy object.

In the above, the calculation which uses two or horizontal and vertical coordinates in order to simplify the calculation has been described. Alternatively, a method may be employed in which an arbitrary outermost position on the outer peripheral edge of an object is set at least two points, a circle passing the two points is drawn, and a reference point of the object is moved by using the center of the circle.

Figure 15:
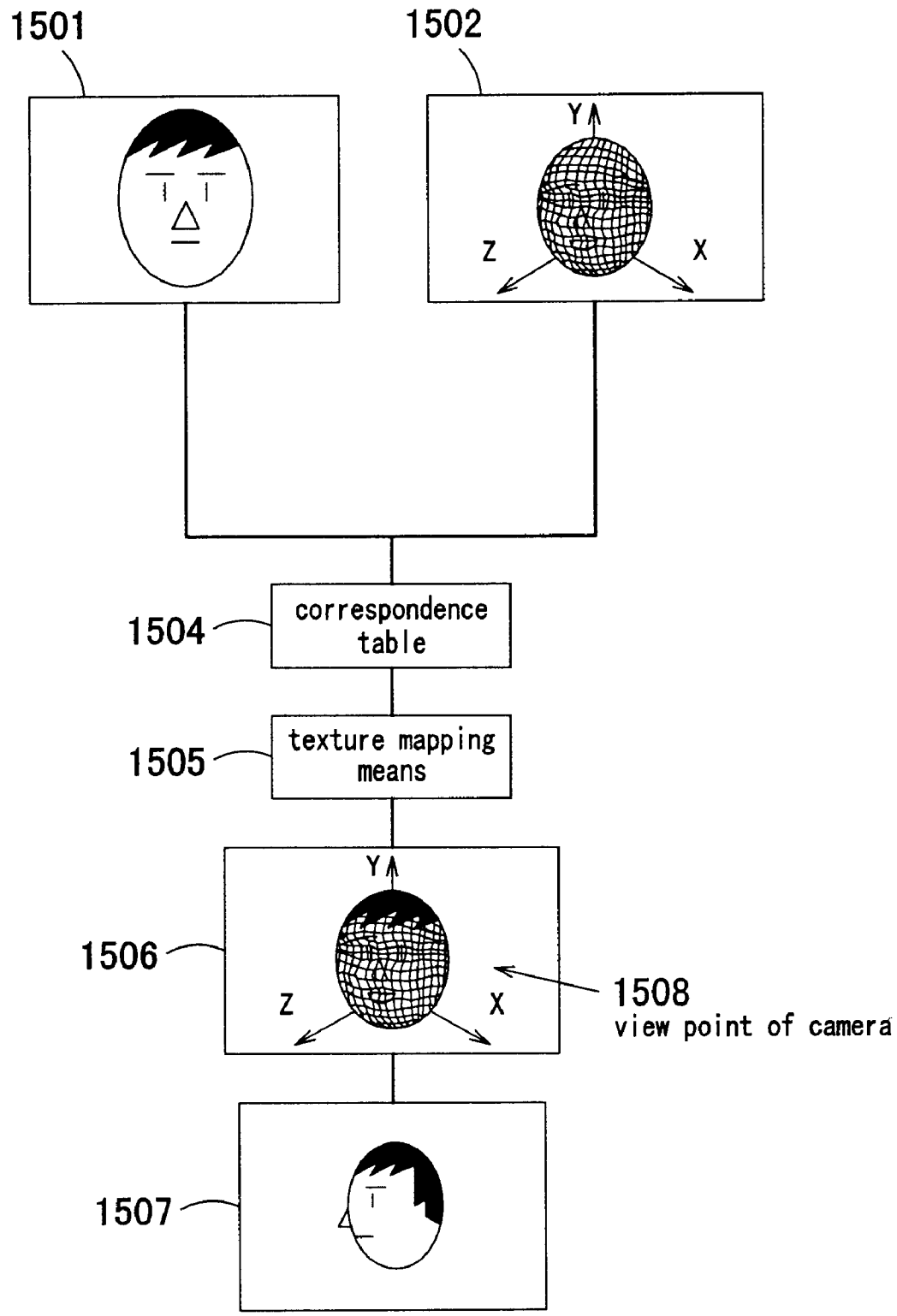
FIG. 15 is a diagram illustrating the operations of three-dimensional user model generating means 123, and two-dimensional rendering means 124.

FIG. 15 is a diagram illustrating the operations of the three-dimensional user model generating means 123, and the two-dimensional rendering means 124.

The reference numeral 1501 denotes a user object which is set by the user object selecting means 118 or the unit object synthesizing means 139, and which does not have a background. The reference numeral 1502 denotes the face of a person or a standard polygon three-dimensional user model which is previously prepared, and which is formed by a polygon such as shown in FIG. 15. The reference numeral 1504 denotes a correspondence table, 1505 denotes texture mapping means, 1506 denotes a three-dimensional model of the user in which the user object 1501 is texture mapped, and 1507 denotes a profile of the user object after two-dimensional rendering which is seen from a camera view point 1508.

The user object 1501 which is set by the user object selecting means 118 or the unit object synthesizing means 139, and which does not have a background is associated by the correspondence table 1504 with image edge pixels corresponding to coordinates of polygons corresponding to the standard polygon three-dimensional user model 1502 serving as a reference. In accordance with the correspondence contents, the image edge pixels of the user object are pasted by the texture mapping means 1505 to the standard polygon three-dimensional user model 1502, so as to be configured as the three-dimensional model in a three-dimensional space.

In the correspondence table 1504, the coordinates of the polygons of the standard polygon three-dimensional user model 1502 serving as a reference are associated with positions of the user object 1501 on two-dimensional coordinates. In the case where the user object 1501 is, for example, a front photo, therefore, coordinate data of polygons which are obtained by rendering the three-dimensional user model 1502 from the front are prepared, and coordinates of the user object 1501 are divided by coordinates of polygons obtained by rendering the standard polygon three-dimensional user model 1502 from the front.

In the case where the user object 1501 is oblique, similarly, the standard polygon three-dimensional user model 1502 is associated with a result of rendering in the same oblique direction.

When the user three-dimensional model 1506 is seen from the camera view point 1508, a profile of the user object after the two-dimensional rendering is configured.

The texture mapping and the two-dimensional rendering are known in the art, and hence their detailed description is omitted. In the above, an example using the face of a human being has been described. Alternatively, a usual object other than a human being may be used. In this case, a standard three-dimensional model suitable for the object is set.

FIG. 16 is a diagram illustrating the operation of the story controlling means 137 and showing a control table for controlling the story. Hereinafter, the operation will be described with reference to the control table.

Three stories are prepared in the story group. In story 1, (1) and (2) are set as a user object, and story number 1 is supplied from the user object group 125 to the story controlling means 137. In story 2, user objects of (1), (2), and the mouth shapes uttering a, u, e, and o are set, and story number 2 is supplied from the user object group 125 to the story controlling means 137. In story 3, user objects of (1), (2), and the mouth shapes uttering a, u, e, and o, and a use object of the crying face of (5) are set, and story number 3 is supplied from the user object group 125 to the story controlling means 137. Similarly, when a user object of an angry face of (4) exists, it is supplied as story 4 to the story controlling means 137.

Figure 17:
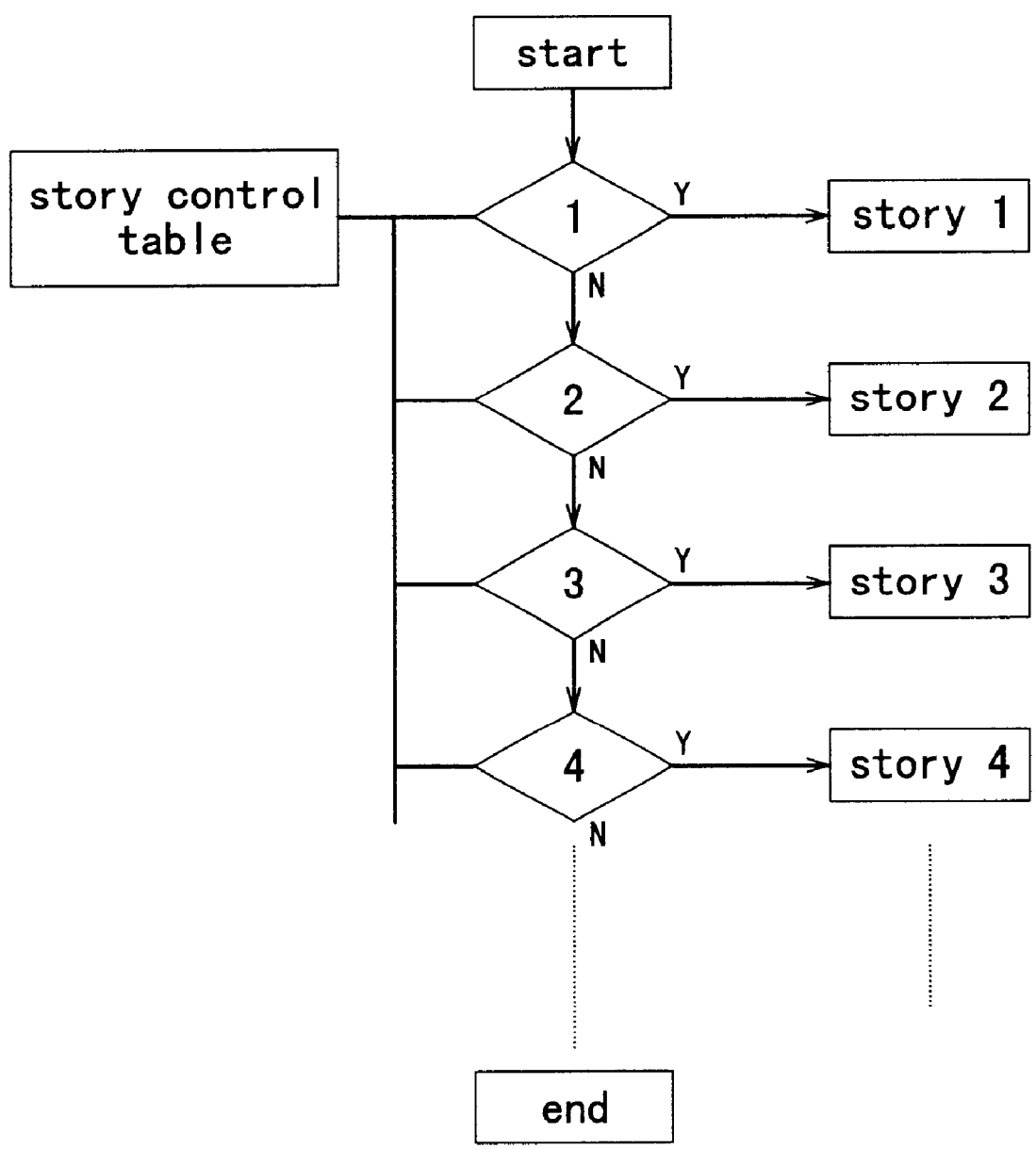
FIG. 17 is a flowchart showing the operation of the story controlling means 137.

FIG. 17 shows the operation of the story controlling means 137 using the story control table of FIG. 16, in the form of a flowchart. The story number supplied from the user object group 125 is compared with the story groups of the story control table. If the story number is 1, story 1 is stored as GI data in a predetermined format, and supplied to the GI data selecting means 113 to control the moving picture file selecting means 103 so as to select the moving picture file corresponding to the story. As a result, a story can be selected together with a background in accordance with the kinds and the number of objects which are input and set by the user.

In the case where the story number is 2, 3, or 4, the story and GI data corresponding to the story number, and a moving picture file serving as a background are selected in a similar manner. When a first still picture of a crying face is input, a background moving picture file in which a crying story is developed is selected, and, when a first still picture of an angry face is input, a background moving picture file in which an angry story is developed is selected.

If no corresponding story exists in the story control table, the operation is ended.

Figure 18:
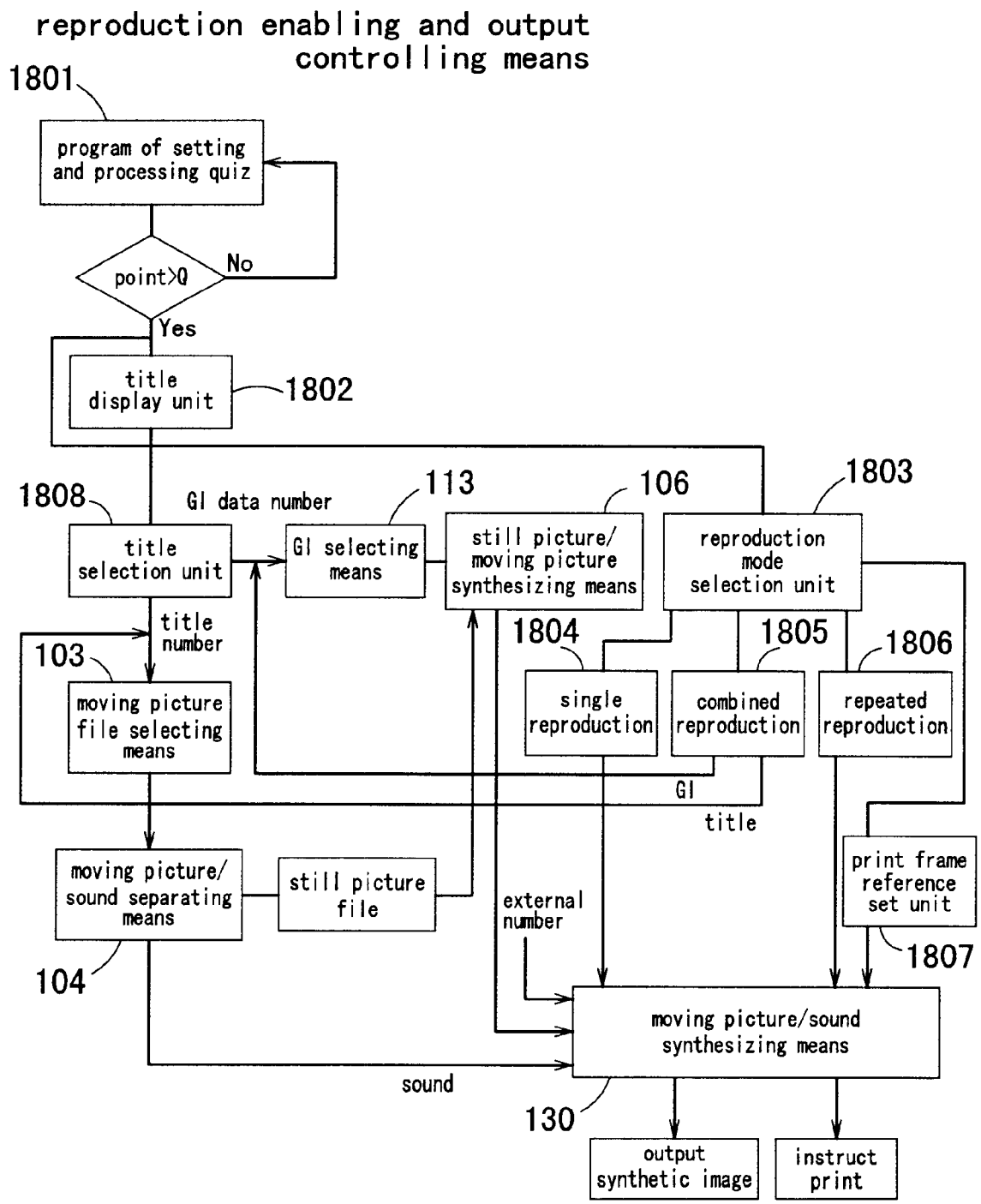
FIG. 18 is a diagram illustrating the operation of synthesis and reproduction controlling means 127.

FIG. 18 is a diagram illustrating the operation of the synthesis and reproduction controlling means 127. In FIG.

18, 1801 denotes a quiz setting process program (point process program) for a usual quiz, 1802 denotes a title display unit for a moving picture file which can be observed by the user in order to select a background moving picture file, 1808 denotes a title selection unit through which the user selects a title, 1803 denotes a reproduction mode selection unit for selecting a reproduction mode such as a single reproduction 1804, a combined reproduction 1805, and a repeated reproduction 1806, and 1807 denotes a print frame setting unit which sets a moving picture file to be printed.

In the case where a quiz or a game can be set, when the user plays a game and the point reaches a certain level, the quiz setting process program 1801 outputs the point. If the point is not lower than a preset value Q, plural titles corresponding to the value Q are supplied as a reproduction enabling signal to the title display unit 1802. While seeing the display, the user selects a title through the title selection unit 1808.

Next, the moving picture file corresponding to the title which is selected through the title selection unit 1808 is set in the moving picture file selecting means 103, and the GI data corresponding to the moving picture file are selected in the GI data selecting means 113. In the moving picture/sound separating means 104, only images are separated from the moving picture file. The moving picture is converted into a still picture file. In the same manner as the still picture file described above, the still picture file is combined with a first still picture group serving as a user object. Also the story control is performed in the same manner.

The reproduction mode selection unit 1803 controls a synthesis image combined with the selected moving picture file so as to be reproduced only one time, repeatedly reproduced, or, when plural moving picture files are selected and combined, reproduced while combining the files. Also the number and kind of objects to which GI data are directed are not restricted. When plural objects are to be combined with one another, steps of transferring a synthetic moving picture of a first object to the moving picture file group 102 serving as a background, and of thereafter performing synthesis of a second object are repeated, thereby allowing plural objects to be combined with one another limitlessly. Different moving picture syntheses may be obtained by using the same GI data and different photos, or moving picture syntheses of different motions may be obtained by using the same photo and different GI data. When the same photo, the same GI data, and different background moving picture files are combined with one another, the system may be applied to a flight simulator or the like in which plural moving pictures are obtained by using the same GI data and replacing backgrounds. Such combinations are infinite. All the combinations are performed by the synthesis and reproduction controlling means 127.

When arbitrary plural still pictures are used in place of the still picture of the still picture file converting means 105 which is obtained by conversion from the moving picture file group 102, plural objects can be switchingly combined with plural still pictures such as dresses.

In accordance with the reproduction mode, a moving picture, and the sound of the moving picture/sound separating means 104 or an external sound are converted into one file by the moving picture/sound synthesizing means 130, and a synthesis image/sound signal is then output.

Furthermore, a frame of a moving picture which is to be printed is reproduced, and an print instruction is given.

FIG. 19 shows a jig which enables the user to perform an imaging process while seeing a portrait of the user under a state where the user is directed to the front.

The reference numeral 1901 denotes the user, 1902 denotes a chair on which the user sits, 1903 denotes a monitor, 1904 denotes a shutter, 1905 denotes an angle member to which the monitor 1903 is fixed, and 1906 denotes a camera. In (1) of FIG. 19, the user 1901 sits on the chair 1902, and sees the face of the user which is displayed on the monitor 1903. When a favorite expression appears, the user presses the shutter 1904. In response to this operation, the camera 1906 completes the imaging.

In (2) and (3), the above is seen from the top, (2) shows a state where an image of the front of the user can be taken, and (3) shows a state where a portrait of the user can be taken.

When the user laterally turns as shown in (3), the monitor 1903 fixed to the angle member 1905 of the chair 1902 turns together with the user 1901. While the user 1901 is directed to the front and remains to see the monitor 1905, the camera 1906 can take a portrait of the user 1901.

Namely, the jig has a feature that, when a favorite expression is attained, a portrait of a person can be taken by the person only while the person is directed to the front and sees the portrait of the person. Therefore, there is a merit that, when an image of a person is to be combined with a background moving picture, the person can input an image of the back of the person, or that of the face which is directed laterally or obliquely and on which a favorite expression appears, while convincing oneself.

In FIG. 19, the chair 1902 is used. In the case where the user 1901 is to stand, when a table on which the user 1901 stands and the angle member 1905 are configured so as to be integrally moved, the same merit is attained.

When plural cameras are disposed in different directions such as the front and a lateral, plural user object displaying means 117 may be set in correspondence with the directions of the cameras, and the imaging process may be performed while the user sees the front and lateral user objects. Preferably, the user object displaying means 117 is placed in front of the user. However, the means may be placed in any position as far as it can be seen by the user.

In place of the camera, another image capturing device of the sequential scanning type, such as a scanner may be used as the first still picture input unit.

In another embodiment, a signal may be read from a record medium such as an optical disk on which the moving picture file 102 and the GI data 112 are recorded, or a still picture file group is recorded in place of the moving picture file.

In the other embodiment, when a disk has structure of plural recording layers such as layers 1 and 2, the moving picture file 102 may be recorded in layer 1, and the GI data 112 or a still picture file group in place of the moving picture file may be recorded in layer 2. This configuration has the following merit. When a player which reproduces only layer 1 is sold in advance and a player having the function of the invention is thereafter sold, the former player which reproduces layer 1 does not reproduce layer 2, and hence the compatibility with the player having the function of the invention which is lately sold and which can reproduce also layer 2 is ensured.

An original image serving as a background is recorded in a first layer of a recording disk having plural recording layers, and GI data may be recorded in a second layer. In this case, a conventional player may reproduce only the first layer, and a player having the function of the invention may uses the data of the second layer when the first layer is reproduced. This configuration has a feature that reproduction can be performed in a manner different from that in a conventional reproduction disk player.

In the embodiments, the output monitor unit 919 is a television monitor or the like. Alternatively, a part of a completed synthesis moving picture is printed as still pictures, and the still pictures may be seen in the form of a picture-card show which is continuous in a certain degree.

In the embodiments, replacement of the face has been described. Alternatively, another object such as a figure of a person showing motion of the whole body, a model, or a manufactured article may be similarly used with attaining the same effects.

In the embodiments, the GI data generating means for giving GI data to a moving picture file is disposed. When a moving picture file having attribute information of a predetermined portion (the mouth portion or the like) is to be externally captured, it is not required to dispose the GI data generating means.

What is claimed is:

1. An image and sound reproduction system comprising:
    a still picture synthesizer that combines at least one arbitrary first still picture with plural second still pictures serving as a background; and
    a synthesis and reproduction controller that, in accordance with position information for combining the first still picture with the second still pictures or selection information for selecting one from the at least one arbitrary first still picture, controls said still picture synthesizer so as to combine the first still picture with the second still pictures, and sequentially reproduce synthetic images, wherein:
        said system further comprises a user object extractor that sets a partial region (hereinafter, referred to as first dummy object) of a dummy still picture serving as a reference, and for extracting a part (hereinafter, referred to as user object) of the first still picture corresponding to arbitrary position coordinates of the first dummy object; an edge detector that detects an edge of the user object extracted by said user object extractor; and a corrector that calculates position correction information which correlates arbitrary pixel coordinates of the edge detected by said edge detector with pixel coordinates of the first dummy object corresponding to the arbitrary pixel coordinates, and that corrects the position information on the basis of the position correction information.

2. An image and sound reproduction system according to claim 1, wherein said synthesis and reproduction controller controls said still picture synthesizer by using the position information or the selection information, so as to combine an arbitrary n-th (n is an arbitrary integer) still picture other than the first still picture with the plural second background still pictures, and sequentially reproduce synthetic images.

3. An image and sound reproduction system according to claim 1, wherein said synthesis and reproduction controller controls said still picture synthesizer by using the position information or the selection information, so as to combine the first still picture with plural arbitrary m-th (m is an arbitrary integer) still pictures other than the second background still pictures, and sequentially reproduce synthetic images.

4. An image and sound reproduction system according to claim 1, wherein said synthesis and reproduction controller controls said still picture synthesizer by using the position information or the selection information, so as to combine an arbitrary n-th (n is an arbitrary integer) still picture other than the first still picture with plural arbitrary m-th (m is an arbitrary integer) still pictures other than the second background still pictures, and sequentially reproduce synthetic images.

5. An image and sound reproduction system according to claim 1, wherein said synthesis and reproduction controller sets plural dummy objects in the second or m-th still pictures serving as a background, controls said still picture synthesizer so as to combine the first still picture or an n-th still picture with the plural second still pictures or plural m-th still pictures, and sequentially reproduce synthetic images, in accordance with position information given to said dummy objects.

6. An image and sound reproduction system according to claim 1, wherein said system further comprises a synthesizer that sets a partial region (hereinafter, referred to as unit object) of the first dummy object or an arbitrary L-th dummy object other than the user object, and for combining the unit object with an image of the user object.

7. An image and sound reproduction system according to claim 2, wherein said system further comprises a synthesizer that sets a partial region (hereinafter, referred to as unit object) of the first dummy object or an arbitrary L-th dummy object other than the user object, and for combining the unit object with an image of the user object.

8. An image and sound reproduction system according to claim 3, wherein said system further comprises a synthesizer that sets a partial region (hereinafter, referred to as unit object) of the first dummy object or an arbitrary L-th dummy object other than the user object, and for combining the unit object with an image of the user object.

9. An image and sound reproduction system according to claim 4, wherein said system further comprises a synthesizer that sets a partial region (hereinafter, referred to as unit object) of the first dummy object or an arbitrary L-th dummy object other than the user object, and for combining the unit object with an image of the user object.

10. An image and sound reproduction system according to claim 5, wherein said system further comprises a synthesizer that sets a partial region (hereinafter, referred to as unit object) of the first dummy object or an arbitrary L-th dummy object other than the user object, and for combining the unit object with an image of the user object.

11. An image and sound reproduction system comprising:
    a still picture synthesizer that combines at least one arbitrary first still picture with plural second still pictures serving as a background; and
    a synthesis and reproduction controller that, in accordance with position information for combining the first still picture with the second still pictures or selection information for selecting one from the at least one arbitrary first still picture, controls said still picture synthesizer so as to combine the first still picture with the second still pictures, and sequentially reproduce synthetic images, wherein:
        said system further comprises a correlator that assigns an identification number to the first still picture or an object in the first still picture, and that correlates deformation information of the first still picture or the object in the first still picture with the position information, the deformation information including a size, horizontal inversion, vertical inversion, longitudinal inversion, an angle, rotation, and distortion on two dimensional coordinates or three-dimensional coordinates, and combinations of the above.

12. An image and sound reproduction system according to claim 11, wherein said system further comprises a recorder that records a background image into a first layer of a disk, and that classifies and records the position information or the deformation information of the first still picture or an object in the first still picture, into a second layer, the deformation information including a size, horizontal inversion, vertical inversion, longitudinal inversion, an angle, rotation, and distortion on two-dimensional coordinates or three dimensional coordinates, and combinations of the above.

13. An image and sound reproduction system according to claim 11, wherein said system further comprises a reproducer that sequentially reproduces background images and recorded in a first layer of a disk, on the basis of information recorded in a second layer.

14. An image and sound reproduction system according to claim 11, wherein said synthesis and reproduction controller controls said still picture synthesizer by using the position information or the selection information, so as to combine an arbitrary n-th (n is an arbitrary integer) still picture other than the first still picture with the plural second background still pictures, and sequentially reproduce synthetic images.

15. An image and sound reproduction system according to claim 11, wherein said synthesis and reproduction controller controls said still picture synthesizer by using the position information or the selection information, so as to combine the first still picture with plural arbitrary m-th (m is an arbitrary integer) still pictures other than the second background still pictures, and sequentially reproduce synthetic images.

16. An image and sound reproduction system according to claim 11, wherein said synthesis and reproduction controller controls said still picture synthesizer by using the position information or the selection information, so as to combine an arbitrary n-th (n is an arbitrary integer) still picture other than the first still picture with plural arbitrary m-th (m is an arbitrary integer) still pictures other than the second background still pictures, and sequentially reproduce synthetic images.

17. An image and sound reproduction system according to claim 11, wherein said synthesis and reproduction controller sets plural dummy objects in the second or m-th still pictures serving as a background, controls said still picture synthesizer so as to combine the first still picture or an n-th still picture with the plural second still pictures or plural m-th still pictures, and sequentially reproduce synthetic images, in accordance with position information given to said dummy objects.

18. An image and sound reproduction system according to claim 15, wherein said system further comprises a recorder that records a background image into a first layer of a disk, and that classifies and records the position information or the deformation information of the first still picture or an object in the first still picture, into a second layer, the deformation information including a size, horizontal inversion, vertical inversion, longitudinal inversion, an angle, rotation, and distortion on two-dimensional coordinates or three dimensional coordinates, and combinations of the above.

19. An image and sound reproduction system according to claim 16, wherein said system further comprises a recorder that records a background image into a first layer of a disk, and that classifies and records the position information or the deformation information of the first still picture or an object in the first still picture, into a second layer, the deformation information including a size, horizontal inversion, vertical inversion, longitudinal inversion, an angle, rotation, and distortion on two-dimensional coordinates or three dimensional coordinates, and combinations of the above.

20. An image and sound reproduction system according to claim 17, wherein said system further comprises a recorder that records a background image into a first layer of a disk, and that classifies and records the position information or the deformation information of the first still picture or an object in the first still picture, into a second layer, the deformation information including a size, horizontal inversion, vertical inversion, longitudinal inversion, an angle, rotation, and distortion on two-dimensional coordinates or three dimensional coordinates, and combinations of the above.

21. An image and sound reproduction system according to claim 14, wherein said system further comprises a reproducer that sequentially reproduces background images and recorded in a first layer of a disk, on the basis of information recorded in a second layer.

22. An image and sound reproduction system according to claim 15, wherein said system further comprises a reproducer that sequentially reproduces background images and recorded in a first layer of a disk, on the basis of information recorded in a second layer.

23. An image and sound reproduction system according to claim 16, wherein said system further comprises a reproducer that sequentially reproduces background images and recorded in a first layer of a disk, on the basis of information recorded in a second layer.

24. An image and sound reproduction system according to claim 17, wherein said system further comprises a reproducer that sequentially reproduces background images and recorded in a first layer of a disk, on the basis of information recorded in a second layer.

25. An image and sound reproduction system comprising:
a still picture synthesizer that combines at least one arbitrary first still picture with plural second still pictures serving as a background; and
a synthesis and reproduction controller that, in accordance with position information for combining the first still picture with the second still pictures or selection information for selecting one from the at least one arbitrary first still picture, controls said still picture synthesizer so as to combine the first still picture with the second still pictures, and sequentially reproduce synthetic images, wherein:
said system further comprises a recorder that records a background image into a first layer of a disk, and that classifies and records the position information into a second layer.

26. An image and sound reproduction system according to claim 25, wherein said synthesis and reproduction controller controls said still picture synthesizer by using the position information or the selection information, so as to combine an arbitrary n-th (n is an arbitrary integer) still picture other than the first still picture with the plural second background still pictures, and sequentially reproduce synthetic images.

27. An image and sound reproduction system according to claim 25, wherein said synthesis and reproduction controller controls said still picture synthesizer by using the position information or the selection information, so as to combine the first still picture with plural arbitrary m-th (m is an arbitrary integer) still pictures other than the second background still pictures, and sequentially reproduce synthetic images.

28. An image and sound reproduction system according to claim 25, wherein said synthesis and reproduction controller controls said still picture synthesizer by using the position information or the selection information, so as to combine an arbitrary n-th (n is an arbitrary integer) still picture other than the first still picture with plural arbitrary m-th (m is an arbitrary integer) still pictures other than the second background still pictures, and sequentially reproduce synthetic images.

29. An image and sound reproduction system according to claim 25, wherein said synthesis and reproduction controller sets plural dummy objects in the second or m-th still pictures serving as a background, controls said still picture synthesizer so as to combine the first still picture or an n-th still picture with the plural second still pictures or plural m-th still pictures, and sequentially reproduce synthetic images, in accordance with position information given to said dummy objects.

30. An image and sound reproduction system comprising:
a still picture synthesizer that combines at least one arbitrary first still picture with plural second still pictures serving as a background; and
a synthesis and reproduction controller that, in accordance with position information for combining the first still picture with the second still pictures or selection information for selecting one from the at least one arbitrary first still picture, controls said still picture synthesizer so as to combine the first still picture with the second still pictures, and sequentially reproduce synthetic images, wherein:
said system further comprises a reproducer that sequentially reproduces background images recorded in a first layer of a disk, on the basis of the position information recorded in a second layer.

31. An image and sound reproduction system according to claim 30, wherein said synthesis and reproduction controller controls said still picture synthesizer by using the position information or the selection information, so as to combine an arbitrary n-th (n is an arbitrary integer) still picture other than the first still picture with the plural second background still pictures, and sequentially reproduce synthetic images.

32. An image and sound reproduction system according to claim 30, wherein said synthesis and reproduction controller controls said still picture synthesizer by using the position information or the selection information, so as to combine the first still picture with plural arbitrary m-th (m is an arbitrary integer) still pictures other than the second background still pictures, and sequentially reproduce synthetic images.

33. An image and sound reproduction system according to claim 30, wherein said synthesis and reproduction controller controls said still picture synthesizer by using the position information or the selection information, so as to combine an arbitrary n-th (n is an arbitrary integer) still picture other than the first still picture with plural arbitrary m-th (m is an arbitrary integer) still pictures other than the second background still pictures, and sequentially reproduce synthetic images.

34. An image and sound reproduction system according to claim 30, wherein said synthesis and reproduction controller sets plural dummy objects in the second or m-th still pictures serving as a background, controls said still picture synthesizer so as to combine the first still picture or an n-th still picture with the plural second still pictures or plural m-th still pictures, and sequentially reproduce synthetic images, in accordance with position information given to said dummy objects.

35. An image and sound reproduction system according to claim 14, wherein said system further comprises a recorder that records a background image into a first layer of a disk, and that classifies and records the position information or the deformation information of the first still picture or an object in the first still picture, into a second layer, the deformation information including a size, horizontal inversion, vertical inversion, longitudinal inversion, an angle, rotation, and distortion on two-dimensional coordinates or three dimensional coordinates, and combinations of the above.

\* \* \* \* \*